United States Patent
Tu et al.

(10) Patent No.: US 11,404,044 B2
(45) Date of Patent: Aug. 2, 2022

(54) METHOD, APPARATUS, ELECTRONIC DEVICE, AND COMPUTER READABLE STORAGE MEDIUM FOR VOICE TRANSLATION

(71) Applicant: SAMSUNG ELECTRONICS CO., LTD., Suwon-si (KR)

(72) Inventors: Mei Tu, Beijing (CN); Wei Liu, Beijing (CN); Fan Zhang, Beijing (CN); Song Liu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 15/931,856

(22) Filed: May 14, 2020

(65) Prior Publication Data
US 2020/0365134 A1 Nov. 19, 2020

(30) Foreign Application Priority Data

May 14, 2019 (CN) .......................... 201910400084.0
Sep. 24, 2019 (CN) .......................... 201910906754.6

(51) Int. Cl.
*G10L 13/033* (2013.01)
*G10L 21/0224* (2013.01)
(Continued)

(52) U.S. Cl.
CPC .......... *G10L 13/033* (2013.01); *G10L 15/005* (2013.01); *G10L 15/063* (2013.01); *G10L 21/0224* (2013.01)

(58) Field of Classification Search
CPC ...... G06F 16/7834; G06F 40/30; G06F 40/40; G06F 40/205; G06F 40/284;
(Continued)

(56) References Cited

U.S. PATENT DOCUMENTS 8,914,277 B1 12/2014 Liu
9,875,739 B2 1/2018 Ziv et al.
(Continued)

FOREIGN PATENT DOCUMENTS

| CN | 108141498 A | 6/2018 |
|---|---|---|
| CN | 109086276 A | 12/2018 |
| CN | 109767792 A | 5/2019 |

OTHER PUBLICATIONS

Communication dated Aug. 14, 2020 issued by the International Searching Authority in counterpart Application No. PCT/KR2020/006379 (PCT/ISA/220, PCT/ISA/210, and PCT/ISA/237).
(Continued)

*Primary Examiner* — Linda Wong
(74) *Attorney, Agent, or Firm* — Sughrue Mion, PLLC

(57) ABSTRACT

A method for voice translation includes: receiving a voice signal of a first language; obtaining a plurality of voice segments forming the voice signal; determining integrity of a first voice segment with respect to a second voice segment based on a voice feature of the first voice segment and a voice feature of the second voice segment; obtaining an output voice segment based on the integrity of the first voice segment with respect to the second voice segment; and outputting a text in a second language corresponding to the voice signal of the first language based on the output voice segment.

19 Claims, 10 Drawing Sheets

(51) Int. Cl.
*G10L 15/00* (2013.01)
*G10L 15/06* (2013.01)

(58) Field of Classification Search
CPC .. G06F 16/3329; G06F 40/211; G06F 40/216; G06F 16/24578; G06F 8/436; G10L 19/018; G10L 25/51; G10L 15/1815; G10L 15/1822; G10L 15/04; G10L 2015/025; G10L 15/00; G10L 13/033; G10L 15/005; G10L 15/063; G10L 21/0224; G10L 15/02; G10L 15/16; G10L 15/08; G10L 15/26; G10L 19/00
See application file for complete search history.

(56) References Cited

U.S. PATENT DOCUMENTS

2009/0265166 A1* 10/2009 Abe .................. G10L 15/04
704/201
2010/0114556 A1* 5/2010 Meng ..................... G06F 40/58
704/2
2017/0286407 A1* 10/2017 Chochowski ........... G10L 15/26
2018/0068656 A1 3/2018 Lehman et al.

OTHER PUBLICATIONS

Gao Huang et al., "Densely Connected Convolutional Networks", Computer Vision Foundation, pp. 4700-4708, 9 pages total.
Alexandre Bérard et al., "End-To-End Automatic Speech Translation of Audiobooks", arXiv:1802.04200v1, Feb. 12, 2018, 5 pages total.
Communication dated Feb. 16, 2022 issued by the European Patent Office in counterpart European Application No. 20805784.4.

* cited by examiner

METHOD, APPARATUS, ELECTRONIC DEVICE, AND COMPUTER READABLE STORAGE MEDIUM FOR VOICE TRANSLATION

CROSS-REFERENCE TO THE RELATED APPLICATION(S)

This application is based on and claims priority under 35 U.S.C. § 119 to Chinese Patent Application No. 201910906754.6, filed on Sep. 24, 2019, and Chinese Patent Application No. 201910400084.0, filed on May 14, 2019, in the State Intellectual Property Office of P.R. China, the disclosures of which are incorporated by reference herein in its entirety.

BACKGROUND

1. Field

The disclosure relates to a field of computer technology, and particularly relates to a method, an apparatus, an electronic device, and a computer readable storage medium for translating voice.

2. Description of Related Art

Voice translation technology includes a technology for translating a voice of one language into a text of another language. As a result of the advent of an era of information internationalization and various social requirements, voice translation has played an important role in communication between people who speak different languages, and attention on researches in the voice translation technology has increased. Although there are various different solutions for implementing voice translation, the accuracy and speed of voice translation still needs to be improved.

SUMMARY

Example embodiments provide a method, an apparatus, an electronic device, and a computer readable storage medium for translating voice.

According to an aspect of an embodiment, there is provided a method for voice translation which may include: receiving a voice signal of a first language; obtaining a plurality of voice segments forming the voice signal; determining integrity of a first voice segment with respect to a second voice segment based on a voice feature of the first voice segment and a voice feature of the second voice segment; obtaining an output voice segment based on the integrity of the first voice segment with respect to the second voice segment; and outputting a text in a second language corresponding to the voice signal of the first language based on the output voice segment.

According to an aspect of an embodiment, there is provided an apparatus for voice translation which may include: a memory storing instructions; and at least one processor configured to, based on the instructions, to: receive a voice signal of a first language; obtain a plurality of voice segments forming the voice signal; determine integrity of a first voice segment with respect to the second voice segment based on a voice feature of the first voice segment and a voice feature of the second voice segment; obtain an output voice segment based on the integrity of the first voice segment with respect to the second voice segment; and output a text in a second language corresponding to the voice signal of the first language based on the output voice segment.

Additional aspects will be set forth in part in the description which follows and, in part, will be apparent from the description, or may be learned by practice of the presented embodiments.

According to an embodiment, the accuracy of the voice translation may improve. According to an embodiment, the speed of the voice translation may improve.

In accordance with an aspect of the disclosure, there is provided a computer program product includes a non-transitory computer readable recording medium having stored therein a program for performing the above method.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
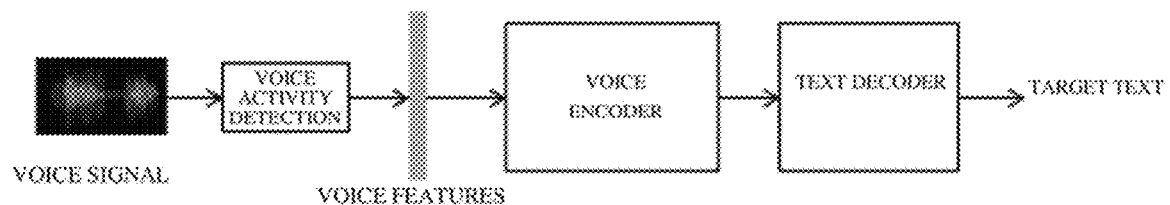
FIG. 1 illustrates a schematic structural diagram of an example voice encoding system.

Various example embodiment of the inventive concept will now be described in greater detail below with reference to the accompanying drawings. However, the inventive concept may have different forms and should not be understood as being limited to the embodiments set forth herein.

Parts not related to the inventive concept may be omitted for clarity. Throughout the drawings, it should be noted that like reference numbers are used to depict the same or similar elements, features, and structures.

The terms and words used in the following description and claims are not limited to the bibliographical meanings, but, are merely used by the inventor to enable a clear and consistent understanding of the inventive concept. Accordingly, it should be apparent to those skilled in the art that the following description of various embodiments is provided for illustration purpose only and not for the purpose of limiting the inventive concept as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

Herein, the terms, such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment of the disclosure.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

FIG. 1 illustrates a schematic flowchart of an example end-to-end voice translation solution. As shown in the figure, processes of the example end-to-end voice translation solution may include dividing, by a voice activity detector, a voice signal into voice segments containing voice, and extracting features of the voice segments to obtain a voice feature of each of the voice segments. The voice feature is processed by a voice encoder and a text decoder to generate a text of a target language (a target-side text shown in the figure).

Figure 2A:
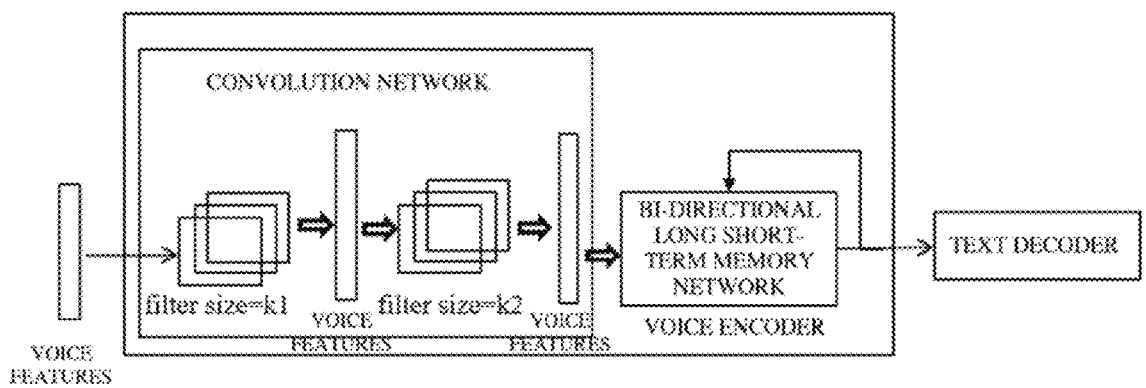
FIG. 2A illustrates a schematic structural diagram of an example voice encoder.

FIG. 2A illustrates a schematic structural diagram of an example voice encoder. As shown in the figure, the voice encoder may include a convolutional network layer and a bi-directional long short-term memory (BiLSTM) layer. The convolutional network layer may use one or more of convolutional network layers, and an output result of each layer may correspond to a voice feature extracted by each layer. A kernel window size of each layer (a filter size shown in the figure) may be fixed, that is, the size of a convolution kernel may be fixed. Two convolutional network layers are shown in FIG. 2A, and the kernel window size of the first layer is k1, and the kernel window size of the second layer is k2. The bi-directional long short-term memory layer may need to consider a previous hidden layer unit when calculating a current hidden layer unit. Therefore, time complexity is proportional to an input period.

Figure 2B:
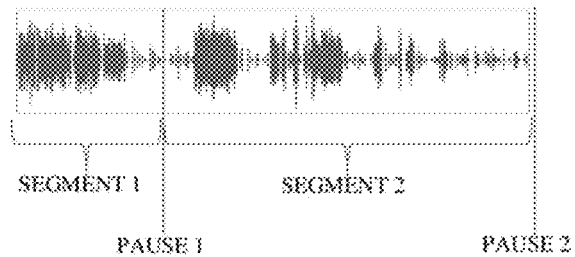
FIG. 2B illustrates a schematic diagram of an example voice activity detector switching a voice segment.

When a voice is divided into a plurality of voice segments by only using a voice activity detector according to the above voice translation scheme, the voice activity detector divides the voice into the voice segments based on pauses of a speaker. For example, the voice is divided based on a time period or point where the speaker pauses to speak, and the time period or point may be a boundary of two adjacent or successive voice segments, as shown in FIG. 2B. As illustrated in FIG. 2B, the voice activity detector detects a speaker pausing to speak at a "pause 1" time period or point, then a voice of the speaker is segmented with respect to the pause 1 time period or point to obtain a segment 1 (from the beginning of the voice to the beginning of the pause 1 time period or point). When the speaker pausing at a "pause 2" time period or point, then the voice is segmented with respect to the pause 2 time period or point to obtain a segment 2 (from the end of the pause 1 to the beginning of the pause 2).

However, in real life, a speaker may often pause when speaking a long sentence. This period of time, at which the speaker pauses to speak, may accidentally cause a voice of the long sentence to be split into segments, and each segment contains text units, most of which are phrases or words, rather than a sentence with a complete meaning. From a perspective of translation, translation of phrases or words (not a sentence) may fail to guide a user to a complete meaning of a sentence, because mere phrases or words may be out of context of the sentence, which may cause translation errors or incomplete translation, thereby reducing the accuracy of voice translation.

The fixed kernel window size of each layer of the convolutional network layers in the voice encoder may lose some semantic information according to the above voice translation scheme.

At the same time, semantic information contained in a voice segment may be different as the voice speed changes. A language spoken with fast voice speed may contain more information per certain time unit than that of a language spoken with slow voice speed. Similarly, a voice of a fast speaker may contain more semantic information per a certain period than that of a slow speaker. The voice speed of the same speaker may vary according to a situation, and the semantic information contained in the voice per unit time may also vary. Therefore, a length of voice required by the same semantic segment may change according to the voice speed, and the fixed kernel window size may be not conducive to capturing such changes, thereby resulting in loss of semantic information and translation errors, and reducing the accuracy of voice translation.

The bi-directional long short-term memory network structure has a high time complexity, which may be not conducive to real-time voice translation. As an input voice segment is long, its encoding time also may increase. Such coding structure may not be suitable for the real-time voice translation.

Above technical problems may be solved according to an embodiment described below. According to an embodiment, a method and an apparatus for translating a voice, an electronic device, and a computer readable storage medium may be provided. Hereinafter, various embodiments of the disclosure will be described in greater detail with reference to the accompanying drawings.

Figure 3:
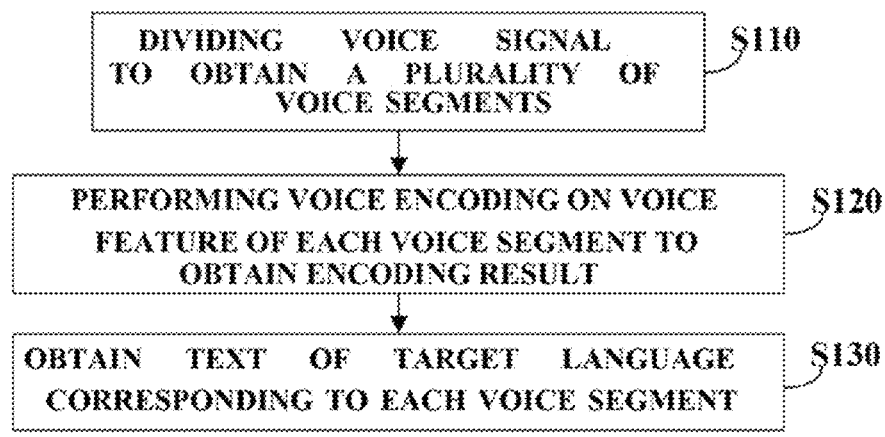
FIG. 3 illustrates a schematic flowchart diagram of a voice translation method according to an embodiment.

FIG. 3 illustrates a schematic flowchart diagram of a voice translation method provided by an embodiment. As shown in the figure, the method may include following operations:

At operation S110, a voice signal to be translated is divided into a plurality of voice segments, and a voice feature of each voice segment is extracted;

At operation S120, voice encoding is performed on the voice feature of each voice segment to obtain an encoding result of each voice segment;

At operation S130, the encoding result of each voice segment is decoded to obtain a text of a target language corresponding to each of the voice segments.

After the voice signal to be translated is obtained, the voice signal may be divided into at least one voice segment by using a voice activity detection (VAD) technique. A voice feature may be extracted from each voice segment. Each voice segment may include one or more frames of the voice signal.

The voice feature of each voice segment may be encoded by a voice encoder to obtain an encoding result of each voice segment. The encoding result may be referred to as an output of the encoder. The output of the encoder may be represented as a hidden layer vector, and called a semantic vector of the voice segment. The vector may be decoded by a decoder, and a text of a target language corresponding to each voice segment may be obtained based on the decoding result. The voice signal of a source language is translated into the text of the target language. For example, when a voice signal of Chinese may be translated into a text of English, then Chinese is the source language, and English is the target language.

In an embodiment, the performing voice encoding on the voice feature of each voice segment to obtain an encoding result of each voice segment may include determining a semantic integrity of a prior voice segment of each voice segment.

The performing the voice encoding on the voice feature of each voice segment to obtain the encoding result of each voice segment may include, when semantics of a prior voice segment, which is a voice segment prior to the voice segment, is determined as being incomplete, combining the voice segment with the prior voice segment, and performing voice encoding on a voice feature of the combined voice segment to obtain an encoding result.

The performing the voice encoding on the voice feature of each voice segment to obtain the encoding result of each voice segment may include, when semantics of the prior voice segment is determined as being complete, performing the voice encoding on the voice feature of the voice segment to obtain an encoding result.

In an embodiment, before performing the voice encoding on the voice feature of each voice segment, whether the voice segment and its prior voice segment need to be reorganized may be determined according to the semantic integrity of the prior segment. When it is determined that reorganization is required, the voice encoding is performed on a voice feature of a voice segment obtained by reorganizing the voice segment and its prior voice segment to obtain an encoding result. When it is determined that reorganization is not required, the voice encoding is performed on the voice feature of each voice segment to obtain an encoding result.

In an embodiment, the voice encoding may be directly performed on a voice segment according to a voice feature of the voice segment. For example, the voice encoding may be directly performed on the voice segment without determining whether reorganization is required.

In an embodiment, the determining whether the voice segment and its prior voice segment need to be reorganized, according to the semantic integrity of the prior segment of the voice segment (reorganizing the voice segment and its prior voice segment may also be referred to as combining the voice segment with its prior voice segment) may include, when the semantics of the prior voice segment of the voice segment is incomplete, determining that the voice segment and the prior voice segment need to be reorganized, and when the semantics of the prior voice segment of the voice segment is complete, determining that the voice segment and the prior voice segment do not need to be reorganized.

In an embodiment, performing the voice encoding on the voice feature of the voice segment obtained by reorganizing the voice segment and its prior voice segment may include combining the voice feature of the voice segment with the voice feature of the prior voice segment of the voice segment to obtain a combined voice feature (i.e. the combined voice feature is used as the voice feature of the combined voice segment), and performing the voice encoding on the combined voice feature to obtain the encoding result. That is, when combining the voice segment with its prior voice segment, the voice feature of the voice segment may be combined with the voice feature of the prior voice segment to obtain a combined voice feature, and the combined voice feature may be used as the voice feature of the combined voice segment.

In an embodiment, when combining the voice segment with its prior voice segment, a voice feature of the combined voice segment may be re-extracted, and the voice encoding may be performed on the re-extracted voice feature to obtain an encoding result.

In an embodiment, the performing voice encoding on the voice feature of each voice segment to obtain an encoding result may include determining a semantic integrity of a prior voice segment of each voice segment.

In an embodiment, the performing voice encoding on the voice feature of each voice segment to obtain an encoding result may include combining voice features of a voice segment and its prior voice segment and performing voice encoding on the combined voice feature to obtain an encoding result when it is determined that semantics of the prior voice segment is incomplete.

In an embodiment, the performing voice encoding on the voice feature of each voice segment to obtain an encoding result may include performing voice encoding on the voice feature of each voice segment to obtain an encoding result when the semantics of the prior voice segment is complete.

In an embodiment, before performing voice encoding on the voice feature of each voice segment, whether to reorganize voice segments (i.e., whether the voice segment and its prior voice segment need to be reorganized) may be determined according to the semantic integrity of the prior voice segment. That is, whether to combine the voice features of the voice segment and its prior voice segment may be determined. When the integrity of the prior voice segment is high enough (i.e., higher than a threshold), that is, the voice segment does not have high semantic correlativity with its prior voice segment, the voice encoding may be performed on the voice segment. When the integrity of the prior voice segment is not high (i.e., lower than a threshold), that is, the voice segment has a high semantic correlativity with its prior voice segment, the voice segment and its prior voice segment may be reorganized, and semantic information about the reorganized voice segment is rendered more complete, the voice encoding may be performed on the voice feature of the reorganized voice segment, and the encoding result may be obtained. According to an embodiment, it may ensure the semantic integrity of the basic translation unit for being subsequently translated, ensure the integrity of the voice feature for performing the voice encoding, reduce a rate of translation errors caused by an incomplete translation unit, and improve the accuracy of the translation results The "prior" voice segment may be understood as a concept in a time sequence. Since a speaker gives a speech in a sequential order, and each voice segment have a time sequence. For a voice segment, its prior voice segment refers to one preceding the voice segment in time. The prior voice segment may be one voice segment prior to the voice segment or a plurality of voice segments prior to the voice segment, such as plurality of neighboring voice segments prior to the voice segment. In an embodiment, the prior voice segment may be one immediately prior to the voice segment, i.e., a previous voice segment of the voice segment.

In an embodiment, when a voice segment is processed (encoded), the voice segment currently being processed is referred to as a current voice segment. It can be understood that the current voice segment may be any of a plurality of voice segments. When a voice signal to be translated is divided into two voice segments according to a time sequence, such as a segment 1 and a segment 2, the segment 1 is referred to as a current voice segment when the segment 1 is being processed, and the segment 2 is referred to as a current voice segment when the segment 2 is processed.

When a current voice segment is a first voice segment (such as the above segment 1) and the current voice segment has no prior voice segment, the voice encoding may be performed on a voice feature of the current voice segment without determining whether reorganization is needed.

In an embodiment, the determining the semantic integrity of the prior voice segment of each voice segment may include determining the semantic integrity of the prior voice segment based on a semantic feature of the prior voice segment.

In an embodiment, the determining the semantic integrity of the prior voice segment of each voice segment may include determining the semantic integrity of the prior voice segment based on the voice feature of the voice segment and the semantic feature of the prior voice segment.

The semantic feature may refer to a decoded feature. The decoded feature may correspond to a target language, and an output of the last hidden layer of the encoder. As an alternative, the determination of the semantic integrity may be achieved through a neural network.

Processing voice segments based on a semantic integrity according to an embodiment is explained below by referring to FIG. 4.

Figure 4:
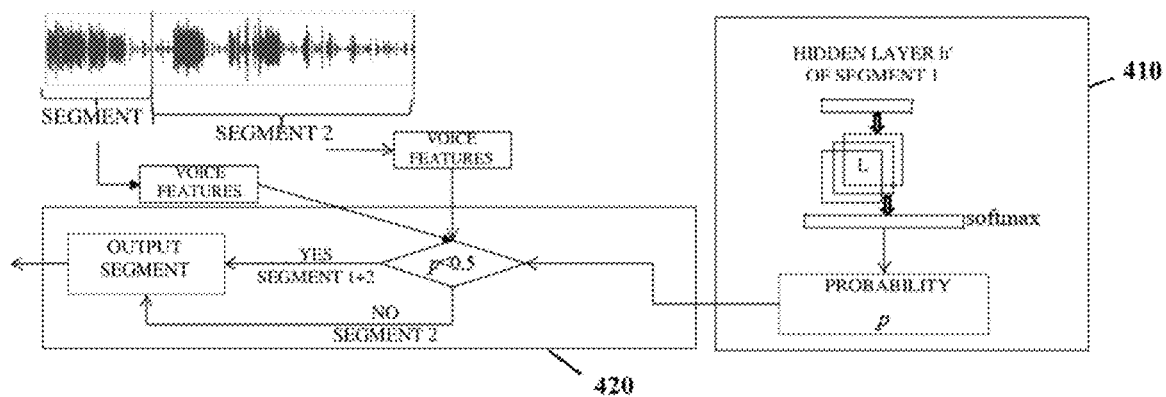
FIG. 4 illustrates a schematic diagram of a working principle of a re-divider according to an embodiment.

FIG. 4 illustrates a schematic diagram of a working principle of a re-divider according to an embodiment.

FIG. 4 illustrates a schematic flowchart diagram for processing a voice segment based on a semantic integrity, which may be implemented by a re-divider. In an embodiment, as shown in the figure, the re-divider may include a translation-based semantic integrity classifier 410 and a segment generator 420, wherein the classifier 410 may be configured to determine the semantic integrity of a prior voice segment (i.e., a semantic integrity probability p) based on a semantic feature of the prior voice segment (i.e., an output of a hidden layer h', that is, a hidden state of the prior voice segment output by a last hidden layer of a decoder), and the segment generator 420 may be configured to determine whether to combine (also referred to as reorganizing) the current voice segment with its prior voice segment, based on the determination result of the classifier 410, compare the semantic integrity probability p with a threshold (such as 0.5), and determine whether to combine the current voice segment with the prior voice segment based on the compared result. For example, whether the semantic integrity probability p is less than the set threshold may be determined. In an embodiment, the semantics of the prior voice segment may be considered as being incomplete when the semantic integrity probability p is less than the set threshold, and the current voice segment and its prior voice segment may be combined. In an embodiment, the prior segment may be considered as being complete when the semantic integrity probability p is equal to or greater than the set threshold, the current voice segment and its prior voice segment may not be combined together. In an embodiment, the classifier 410 may be implemented by a convolutional network, as shown in FIG. 4, but is not limited thereto. The convolutional network may include a convolutional layer (L in FIG. 4) and a softmax layer, but is not limited thereto.

In an embodiment, voice segments obtained by voice activity detection segmentation may include at least two segments (such as a segment 1 and a segment 2, but are not limited thereto). The principle of the re-divider is further described in detail below with reference to FIG. 4.

In an embodiment, the segment 1 is the first segment (i.e., the starting segment), the segment 1 does not have its prior segment, therefore, an initialization parameter of the re-divider may be zero, and the segment generator 420 may directly output a voice feature of the segment 1, and the voice encoder directly performs voice encoding on the voice feature of the segment 1.

The segment 2 has its prior voice segment, the segment 1, and the decoder may output a hidden layer h' of the segment 1, and the hidden layer h' may be input to a convolution layer L of the classifier 410, and pass through the softmax layer to obtain the semantic integrity probability p. The segment generator 420 may determine whether the semantics of the segment 1 is complete according to the semantic integrity probability p output by the classifier 410. In an embodiment, when p is less than the set threshold (such as 0.5, but is not limited thereto), the semantics of the segment 1 is determined as being incomplete, and voice features of the segment 1 and the segment 2 may be combined, and the combined voice feature may be input to the voice encoder. When p is equal to or greater than the set threshold, the semantics of the segment 1 is determined as being complete, and the segment 1 and the segment 2 are not combined, and the voice feature of segment 2 is directly input to the voice encoder.

It should be noted that an output segment shown in the figure is for easy understanding of whether a voice feature of a current voice segment and its prior voice segment need to be combined, and the segment generator 420 may output the combined voice feature or uncombined voice features.

Figure 5:
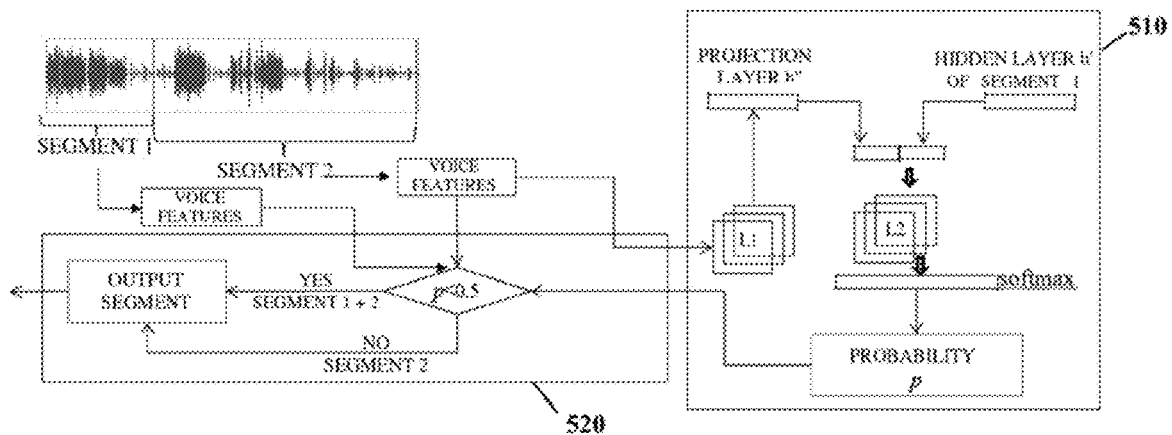
FIG. 5 illustrates a schematic diagram of a working principle of a re-divider according to another embodiment.

Processing voice segments based on a semantic integrity according to an embodiment is explained below by referring to FIG. 5. FIG. 5 illustrates a schematic diagram of a working principle of a re-divider according to another embodiment.

FIG. 5 illustrates a schematic flowchart diagram for processing a voice segment based on a semantic integrity provided. As shown in the figure, a re-divider may include a voice-based and translation-based joint classifier 510 and a segment generator 520. The joint classifier 510 may replace the translation-based semantic integrity classifier 410 of FIG. 4. In an embodiment, the joint classifier 510 may be configured to determine a semantic integrity of a prior voice segment based on a voice feature of a current voice segment and a hidden layer h' (decoding-output) of the prior voice segment. The joint classifier 510 may be implemented by a convolutional network as shown in FIG. 5, but is not limited thereto. The convolutional network may include two sub-networks. One sub network may include a convolutional layer L1 shown in FIG. 5 and a projection layer, but is not limited thereto, and may be configured to extract and map the voice feature of the current voice segment. Another sub-network may include a convolution layer L2 and a softmax layer and may be configured to determine a semantic integrity of the prior voice segment based on a feature vector h" output by the projection layer and the hidden layer h' (decoding-output) of the prior voice segment.

The principle of the re-divider is further described in detail below with reference to FIG. 5.

In an embodiment, a segment 1 is a starting segment, the segment generator 520 may directly output a voice feature of the segment 1, and a voice encoder may directly perform voice encoding on the voice feature of the segment 1.

For a segment 2, the joint classifier 510 may downsample a voice feature of a segment 2 through the convolutional layer L1, and map samples to a vector space through the projection layer to obtain a mapping vector h", and a decoder may output the hidden layer h' of the segment 1 and the mapping vector h" in the time dimension may be spliced and input to the convolutional layer L2, and pass through the softmax layer to obtain the semantic integrity probability p. The segment generator 520 may determine whether to combine voice features of the segment 1 and the segment 2, according to the semantic integrity probability and the set threshold (such as 0.5, but is not limited thereto). In an embodiment, when p is less than 0.5, the voice features of the segment 1 and the segment 2 are combined, and the voice encoder may encode the combined voice feature to obtain an encoding-result corresponding to the segment 2. In an embodiment, when p is equal to or greater than 0.5, the voice feature of the segment 2 is output.

The scheme for re-dividing a voice segment based on a semantic integrity may utilize characteristics of a hidden layer output by a text-decoding, the hidden layer containing all semantic information output, and determine the semantic integrity of the hidden layer output, and reorganizes voice features of voice segments based on the obtained segmentation results (such as VAD results). According to an embodiment, an input for a next decoding may be rendered more complete in view of the semantics, and the accuracy of the decoding result may be improved.

In an embodiment, the performing voice encoding on the voice feature of each voice segment to obtain an encoding result may include determining a feature vector of each voice segment based on the voice feature of each voice segment.

In an embodiment, the performing voice encoding on the voice feature of each voice segment to obtain an encoding result may include obtaining the encoding result based on the feature vector of each voice segment.

It should be noted that, when a feature vector of each voice segment may be determined based on the voice feature of each voice segment, a used voice feature may be the voice feature of the voice segment which is extracted when a voice signal to be translated is divided to obtain a plurality of voice segments, that is, the voice feature extracted in the above operation S110. When a semantic integrity of a prior voice segment of a voice segment is determined after the operation S110, the used voice feature may be one determined based on the determination result of the semantic integrity of the prior voice segment. In an embodiment, when the voice features of the voice segment and its prior voice segment are combined, the used voice feature may be a combined feature when the feature vector, that is, the combined feature is used as the voice feature of the voice segment, and when the voice feature of the voice segment and the voice feature of its prior voice segment are not combined, the used voice feature is the voice feature of the voice segment extracted in the operation S110.

Figure 6A:
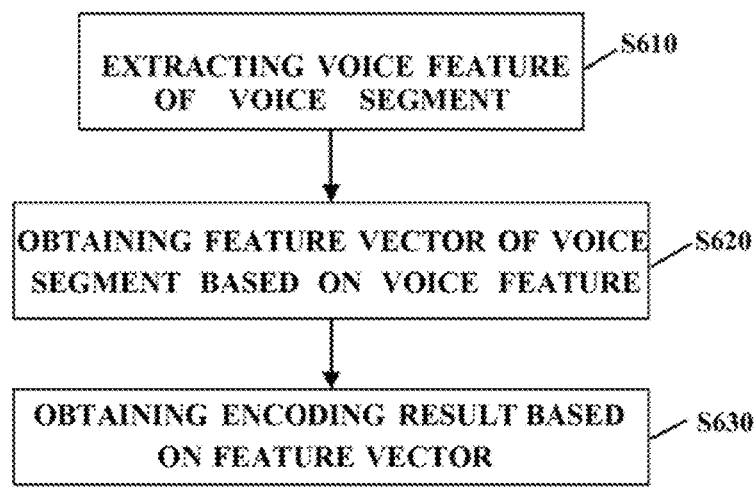
FIGS. 6A and 6B respectively illustrate schematic flowcharts of performing voice encoding on a voice feature according to embodiments.
Figure 6B:
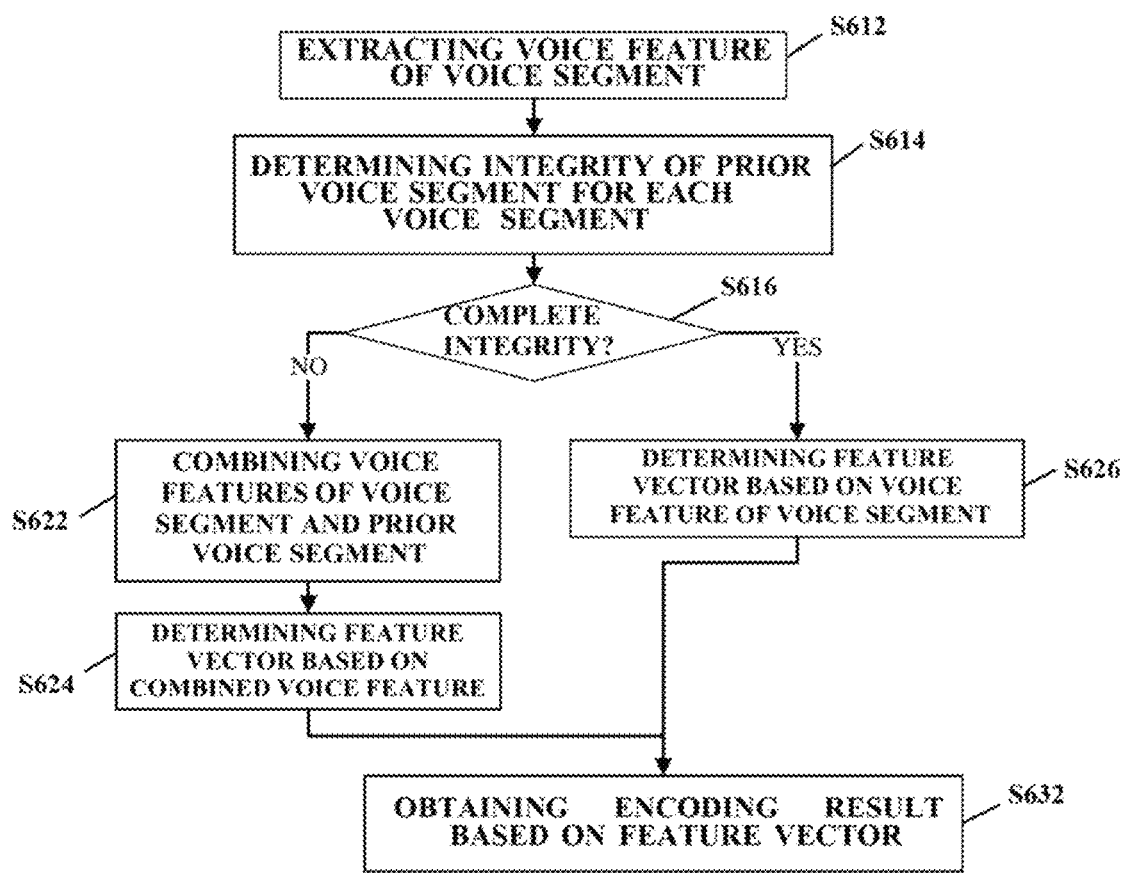

In an embodiment, FIG. 6A and FIG. 6B respectively illustrate schematic flowcharts of performing encoding on a voice feature of each voice segment. Referring to FIG. 6A, after a voice signal to be translated is divided into a plurality of voice segments by the VAD technique and a voice feature is extracted from each of the voice segments at operation S610. At operation S610, a voice encoding process may be respectively performed on each voice segment based on the voice features of each voice segment. At operation S620, a feature vector of each voice segment may be obtained based on the voice feature of each voice segment. At operation 630, an encoding result may be obtained based on the feature vector of each voice segment.

Referring to FIG. 6B, after extracting the voice feature of each voice segment at operation S612 and before encoding the voice feature of each voice segment at operation S632, whether segments need to be combined may be determined based on a semantic integrity of a prior voice segment of a current voice segment at operation S614. Based on determination of the semantic integrity of the prior voice segment at operation S616, when it is determined that the segments need to be combined, the voice feature of the current voice segment and the voice feature of the prior voice segment may be combined at operation S622, a feature vector of the current voice segment may be determined according to the combined voice features at operation S624, and an encoding result of the current voice segment may be obtained based on the feature vector at operation S632. When it is determined that the segments do not need to be combined, the voice feature of the current voice segment is encoded, that is, the feature vector of the current voice segment is determined based on the voice feature of the current voice segment at operation S626, and an encoding result of the current voice segment is obtained based on the feature vector at operation S632.

After obtaining the feature vector of the voice segment, an encoding result may be obtained by using a long short-term memory network, but is not limited thereto.

In an embodiment, the determining the feature vector of each voice segment based on the voice feature of each voice segment may include extracting the voice feature of each voice segment based on at least two convolution processing parameters, and mapping the feature extracted based on the at least two convolution processing parameters to obtain the feature vector.

In an embodiment, the convolution processing parameters may include, but are not limited to, a size of a convolution kernel, that is, a convolution kernel size.

As can be seen from the foregoing description, the semantic information contained in the voice segment per unit time may be different due to different voice speed, and the fixed convolution processing parameters (such as the fixed kernel window size, i.e. the size of the convolution kernel) will causes loss of semantic information, thereby resulting in translation errors. According to an embodiment, feature extraction is performed on the voice feature of the voice segment or the combined voice features corresponding to the voice segment by using at least two different convolution processing parameters, so that it is possible to capture complete phonemes through a variety of different convolution processing parameters even in the case of variable voice speed, thereby ensuring the accuracy of translation results.

It should be noted that, embodiments of the disclosure does not limit the implementations that the feature extraction is performed on the voice feature of the voice segment by using at least two different convolution processing parameters, and the features extracted by using at least two different convolution processing parameters are mapped to obtain the feature vector. That is, the specific structure of the network model for performing feature extraction on the voice features may be selected according to actual requirements. For example, Convolutional Neural Networks (CNN), Dense Connected convolutional networks (DenseNet), etc. may be used.

Figure 7A:
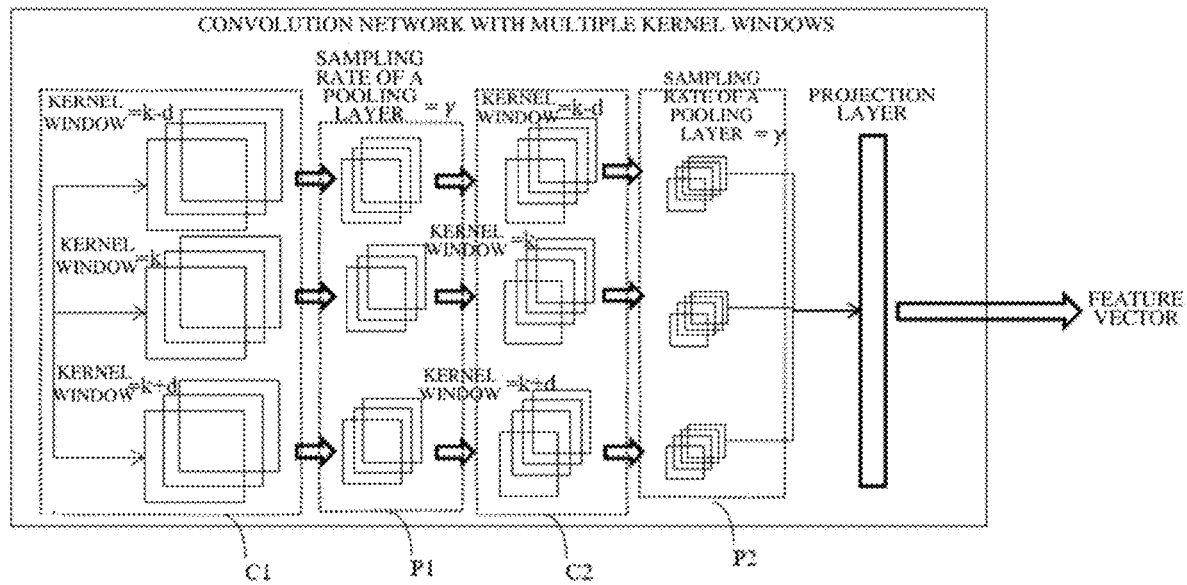
FIG. 7A illustrates a schematic structural diagram of a convolution network according to an embodiment.

As an example, FIG. 7A illustrates a schematic structural diagram of a feature extraction network according to an embodiment. The feature extraction network may be a convolutional network with a plurality of kernel windows. The convolutional network may be a Convolutional Neural Network (CNN), but is not limited thereto. The convolutional network with the plurality of kernel windows may also be referred to as a multi-kernel window convolution network, a multi-convolution kernel size convolution network, a multi-size convolution network, etc., and may also be referred to as a multi-filter-sized CNN. As shown in the figure, the convolution network may include two convolutional layers C1 and C2 shown in the figure, wherein each convolution layer may include three convolution processing parameters (such as a kernel window size), k−d, k, and k+d shown in the figure respectively represent the sizes of three kernel windows. For example, for a convolution layer whose kernel window is k, the convolution kernel size is k*1, and for a convolutional layer whose kernel window is k−d, the convolution kernel size is (k=d)*1. Each convolutional layer may be connected with a corresponding pooling layer, such as P1 and P2 as shown in the figure. All features output by the pooling layer P2 may be mapped to a vector space through the feature projection layer (the projection layer shown in the figure) to obtain a corresponding feature vector.

It should be noted that the above convolution kernel size is only an example, and the three kernel windows may have widths of k, k−d, and k+d, respectively, and a height of 1. In an embodiment, the size of each kernel window may be configured based on actual requirements. For example, the sizes of the three convolution kernels may be w1*h1, w2*h2, and w3*h3, respectively, where w1, w2 and w3 respectively represent the widths of the three convolution kernels, h1, h2, and h3 respectively represent the heights of the three convolution kernels, and the width and height of each convolution kernel may be configured based on actual requirements. In an embodiment, since a voice signal may have a long duration time in a time domain and a frequency range of the voice signal in frequency domain may have a relatively small fixed range, as an alternative, each convolution kernel may have a height of 1, and a width of which the values may be different based on the actual requirements. That is, when the voice feature of each voice segment is extracted by using at least two convolution processing parameters, convolution processing may be performed only in the time domain, and not in the frequency domain, so as to avoid excessive loss of information in the frequency domain and reducing a translation quality.

In an embodiment, based on the network structure shown in FIG. 7A, after the voice feature of the current voice segment (the voice feature of the voice segment or the current voice segment combined with its prior voice segment) may be input to the convolution network, the feature extraction may be performed on the voice feature by a convolutional layer C1 which generates a plurality of feature maps obtained with different kernel sizes. Then the feature maps may be down-sampled by a P1 layer with a sampling rate of γ. The feature extraction and the down-sampling may be further performed on the down-sampled feature maps by using a C2 layer and a P2 layer, respectively, and then the features output by each pooling layer of the P2 layer may be mapped by a projection layer to a vector space to obtain a corresponding feature vector.

Since each convolutional layer uses three different sizes of kernel windows to perform feature extraction on voice features, extracting a complete feature through plurality of sizes of kernel windows may be ensured according to an embodiment even when voice speed changes. It can be understood that, in an embodiment, the pooling layer may be an unessential network layer, and the number of the pooling layers does not need to correspond to the number of the convolution layers. As shown in FIG. 7A, the convolution network may not include a pooling layer, or it may only include one pooling layer. The pooling operation of the pooling layer may be a maximum pooling operation.

Figure 7B:
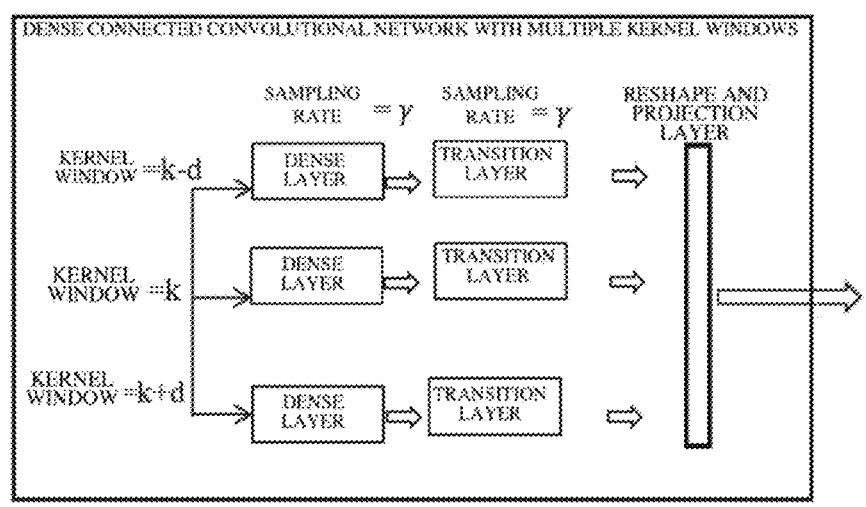
FIG. 7B illustrates a schematic structural diagram of a convolution network according to another embodiment.

FIG. 7B illustrates a schematic structural diagram of another feature extraction network according to an embodiment. The feature extraction network may be a convolutional network with a plurality of kernel windows, which differs from the network shown in FIG. 7A in that the convolutional network of the present embodiment may be a DenseNet. Compared with the network shown in FIG. 7A, the DenseNet uses a dense layer (also known as a dense block) and a transition layer instead of the convolutional layer and the pooling layer in the network shown in FIG. 7A. The convolutional network with the plurality of kernel windows in the present embodiment may also be referred to as a multi-kernel window dense connected convolution network, a multi-convolution kernel size dense convolution network, a multi-size dense convolution network, etc., and may also be referred to as a multi-filter sized dense volume. As shown in FIG. 7B, the DenseNet may include a dense layer, a transition layer, and a reshape & projection layer which are sequentially cascaded. As shown in the figure, the sampling rate (i.e., the stride) of the dense layer and the transition layer is γ, and the dense layer may include dense layers of three convolution processing parameters (the size of the kernel window in this example), and k−d, k, and k+d shown in the figure represent the size of three kernel windows, respectively. Taking the dense layer of the kernel window having the size k as an example, the convolution kernel size is k*1. Each dense layer may be connected with a corresponding transition layer. The transition layer may reduce the channel dimension of the features output by the dense layer. All the features output by the transition layer outputs may be mapped to a vector space through a reshape and projection layer to obtain the corresponding feature vector.

In an embodiment, the extracting the voice feature of each voice segment based on at least two convolution processing parameters may include extracting the voice feature of each voice segment based on at least one convolution layer, which comprises at least two convolution processing parameters.

In an embodiment, when voice speed of a speaker is relatively slow (for example, the voice speed of the speaker is less than average voice speed corresponding to the same source language), or the voice speed of a source language is relatively slow, a voice segment that expresses a certain complete semantic information may have a relatively longer length. To the contrary, when the voice speed of a speaker is relatively fast (for example, the voice speed of the speaker is not less than the average voice speed corresponding to the same source language), or the voice speed of a source language is relatively fast, a voice segment that expresses a certain complete semantic information may have a relatively shorter length. When the feature extraction is merely performed according to the fixed convolution processing parameters, it cannot process situations of different voice speed, thereby causing loss of semantic information and translation errors, and reducing accuracy of voice translation. In an embodiment, it may set a plurality of (e.g., three) different convolution processing parameters (e.g., k−d, k, and k+d, etc.), so that the feature extraction may be accurately performed for voice segments having different voice speed, which takes into account a diversity of voice speed, and thus accuracy of voice translation is greatly improved, and performance of voice translation is rendered more robust.

In an embodiment, the convolution processing parameter may be determined based on at least one of the following information: voice speed information about a source language corresponding to a voice signal to be translated, and a rate of extracting a voice feature of each voice segment.

In an embodiment, the voice speed information may include at least one of average voice speed, slowest voice speed, and fastest voice speed.

In order to better ensure that a complete phoneme is extracted, at least two convolution processing parameters may be determined based on a voice speed information feature extraction rate of a source language. That is, different convolution processing parameters may be used for different source languages. As illustrated in FIGS. 7A and 7B, k and d may both be hyper-parameters related to voice speed, which may be determined based on at least one of voice speed information about the source language and the feature extraction rate.

In an embodiment, the values of k and d may be determined by the following manner.

For example, average voice speed of v phonemes/second is given for a certain language, a processing rate of extracting a voice feature is f frames/second by the VAD technology, then the number of frames per phoneme is f/v, k may have a value f/v, i.e. k=f/v. Further, when the fastest voice speed and the slowest voice speed of the language are $v_{max}$, $v_{min}$, respectively, then $$d = \left(\frac{f}{v_{min}} - \frac{f}{v_{max}}\right)/2.$$

For example, the average voice speed of Mandarin is 300 words/minute, which is about 10 phonemes/second. When f=100, then k=10.

In an embodiment, the voice speed information about a certain language may be obtained by statistical analysis of data, or can be obtained experimentally.

It can be understood that the determining the convolution processing parameter may be an optional processing manner. In an embodiment, the manner of determining the convolution processing parameter based on the foregoing information may be configured according to the requirements of an actual application scenario. For example, when a configured convolution kernel window has two sizes, the two sizes may be $$\frac{f}{v_{min}} \text{ and } \frac{f}{v_{max}},$$

respectively. For another example, when the configured convolution kernel window has five sizes, the five kernel window sizes can be k−2d, k−d, k, k+d, and k+2d, respectively. At this time, k may have a value of f/v, i.e., k=f/v and $$d = \left(\frac{f}{v_{min}} - \frac{f}{v_{max}}\right)/4.$$

In an embodiment, the extracting the voice feature of each voice segment based on at least two convolution processing parameters, and/or mapping the voice feature extracted based on the at least two convolution processing parameters to obtain the feature vector may include determining a voice length of the voice segment.

In an embodiment, the extracting the voice feature of each voice segment based on at least two convolution processing parameters, and/or mapping the voice feature extracted based on the at least two convolution processing parameters to obtain the feature vector may include extracting the voice feature of each voice segment based on at least two convolution processing parameters when the voice length is greater than a length threshold, and mapping the voice feature extracted based on the at least two convolution processing parameters to obtain the feature vector.

In an embodiment, the extracting the voice feature of each voice segment based on at least two convolution processing parameters, and/or mapping the voice feature extracted based on the at least two convolution processing parameters to obtain the feature vector may include merging voice features of the voice segment to obtain the feature vector when the length of the voice is not greater than the length threshold.

In an embodiment, for a voice feature of each voice segment, whether to re-extract the voice feature based on a voice length corresponding to the voice feature may be determined. When the voice length is greater than a set length threshold, the feature extraction may be performed. Otherwise, the voice feature may not be extracted, and the voice features may be merged to obtain the merged feature vector. Since a voice segment with a small length contains a small amount of information, when down-sampling or feature extraction is performed, it may cause excessive loss of information and reduce a translation quality. In an embodiment, feature extraction may not be performed on a voice segment with a small voice length to avoid re-extracting a voice feature of the shorter voice segment and causing excessive loss of information, thereby improving a translation accuracy. A specific manner of the feature merging may include but not limited to a manner of weighted summation. In an embodiment, when the voice length is not greater than the length threshold, the voice feature may be processed by a feedforward network (FFN) to obtain a corresponding feature vector.

It can be understood that, for a current voice segment, when its voice feature is one extracted from a voice segment which is obtained by performing segmentation, its voice length is a voice length of a current voice segment, and when its voice feature is a voice feature obtained by combining an extracted voice feature from the voice segment and a voice feature of a prior voice segment, its voice length is a voice length corresponding to a merged voice segment. When a segment 2 is processed, and a voice feature of a segment 1 and the voice feature of the segment 2 are combined, the voice length of the segment 2 is the combined voice length of the segment 1 and the segment 2.

Figure 8:
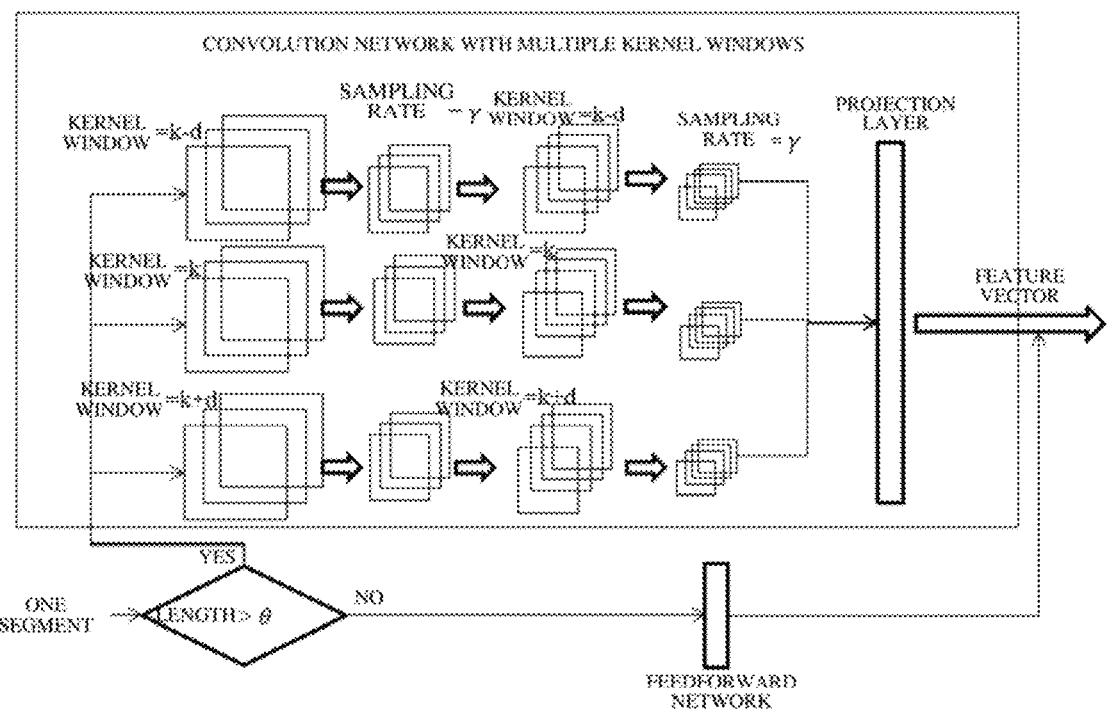
FIG. 8 illustrates a schematic structural diagram of a sampling layer according to an embodiment.

FIG. 8 illustrates a schematic structural diagram of a sampling layer based on a long short-term control and a multi-kernel window according to an embodiment. In an embodiment, the sampling layer may include a multi-kernel window convolution network and a feedforward network, but is not limited thereto. The multi-kernel window convolution network may include, but not limited to the network structure shown in FIG. 7A or FIG. 7B, the network structure shown in FIG. 7A is an example of the convolutional network with a plurality of kernel windows in this example, and the description of the convolutional network with a plurality of kernel windows may refer to the description of the example shown in FIG. 7A. As shown in FIG. 8, based on the sampling layer in this example, for a voice feature of each voice segment, it is possible to determine whether the voice feature needs to be sampled (i.e., feature re-extraction) by a long short-term splitter (rhombus shown in the figure). In an embodiment, when the voice length (the length shown in the figure) of the voice segment (one segment shown in the figure) is greater than the length threshold ($\theta$ shown in the figure), the voice feature is input to the convolutional network for performing convolution sampling based on the multi-kernel windows, so as to ensure that there is a window capturing a complete phoneme in the case of variable voice speed. When the voice length of the voice segment is not greater than the length threshold, the voice feature is input to the feedforward network to be processed, so as to avoid excessive loss of information due to sampling the voice features whose voice length is less than the threshold.

In an embodiment, the extracting the voice feature of each voice segment based on at least two convolution processing parameters, and/or mapping the voice feature extracted based on at least two convolution processing parameters to obtain the feature vector may include extracting a voice feature of each voice segment based on at least two convolution processing parameters, and down-sampling the extracted voice feature, and mapping the down-sampled feature.

After performing feature re-extraction on the voice feature, the extracted feature may be further down-sampled to reduce subsequent data processing load and improve a processing efficiency. As the examples shown in FIG. 7A and FIG. 8, the extracted feature may be down-sampled by the pooling layer. As the example shown in FIG. 7B, the feature extracted by the dense layer may be down-sampled by the transition layer. Wherein, the pooling operation of the pooling layer may be a maximum pooling operation.

It should be noted that the number of times of down-sampling may be configured based on actual requirements. When the number of performing feature re-extraction based on convolution processing parameters may be more than one time, such as two-time feature extraction being performed by two convolution layers in FIGS. 7A and 7B and FIG. 8, and the order of the down-sampling and feature extraction performed by convolution may also be configured based on requirements. For example, the down-sampling may be performed after performing feature extraction by convolution each time, or may be performed after all convolution feature extractions are completed. The number of down-sampling may be the same as or different from the number of the convolution feature extractions.

In an embodiment, the length threshold may be determined based on at least one of a down-sampling rate, the number of down-sampling, and the convolution processing parameter.

In order to balance the excessive loss of information and much data processing load caused by oversampling, the length threshold may be determined based on the down-sampling rate, the number of down-sampling, and the used convolution processing parameters so that the problem of low processing efficiency due to excessive data volume is avoided when the voice length is too long, while ensuring that the feature of each voice segment is relatively complete.

In an embodiment, the length threshold $\theta$ may satisfy a following equation:

$$\theta > \gamma^N,$$

where $\gamma$ represents the down-sampling rate, and $N$ represents the number of the down-sampling.

In an embodiment, the length threshold θ may satisfy a following equation:

$$\theta > \gamma^N + 2k,$$

where k is a convolution processing parameter as described above, such as k=f/v.

Referring to FIGS. 7A and 8, γ is a sampling rate of the pooling layer, and N is the number of pooling layers, that is, the number of layers. Referring to FIG. 7B, γ is a sampling rate of the transition layer, and N is the number of the transition layers.

In an embodiment, a specific value of the length threshold θ may be determined according to actual application requirements and experiences. Taking the convolution network shown in FIG. 7A as an example, for example, when the number of the convolution layers and the pooling layers is 2, that is, as the convolution networks shown in FIGS. 7 and 8, the sampling rate γ may generally have a value of 2, and θ may have a value of 128. Based on the method for determining the length threshold, the problem of oversampling on the basis of reducing the amount of data processing may be effectively avoided. Additionally, balance between the output result of the convolution network and the output result of the feedforward network may be well balanced, and it may be effectively avoided that there is a big difference between the information contained in the feature vector output after convolution sampling of the voice features and the information contained in the feature vector of the voice feature that does not need to be sampled.

In addition, it should be noted that, in an embodiment, the voice length of the voice segment may usually be represented by the number of frames of the signal included in the voice segment. For example, when a voice segment includes 500 frames of signal, and the length threshold is 128 frames, the voice features of the voice segment need to be performed feature re-extraction based on convolution processing parameters. Of course, the voice length of the voice segment may also be represented by an actual duration of the voice segment. For example, for the voice segment including 500 frames of signal, the voice length may be equal to a length of signal per frame multiplied by 500 frames. Correspondingly, the length threshold is also the duration, for example, the length threshold may be the length of signal per frame multiplied by 128.

In an embodiment, the obtaining the encoding result of each voice segment based on the feature vector of each voice segment may include obtaining a hidden layer representation corresponding to a dimension based on a vector representation of each dimension and a vector representation of the prior dimension of the dimension in the feature vector of each voice segment.

In an embodiment, the obtaining the encoding result of each voice segment based on the feature vector of each voice segment may include obtaining the encoding result of each voice segment based on the hidden layer representation corresponding to each dimension in the feature vector of the voice segment.

It can be seen from the foregoing description that the voice feature itself of the voice segment has time sequence information. Correspondingly, each dimension of a feature vector of the semantic segment may also have time sequence information. For example, when a feature vector may be expressed as $[h_1, h_2, h_3, \ldots, h_m]$, where n is a dimension of the vector, and $h_1$ ($1 \leq i \leq n$) is vector representation of the $i^{th}$ dimension. In time sequence, $h_i$ is prior to $h_{i+1}$, $h_i$ is vector representation of a prior dimension of $h_{i+1}$, and $h_1$ to $h_{n-1}$ are vector representations of a prior dimension of $h_n$.

It should be noted that, for any dimension in the feature vector, when the hidden layer representation corresponding to the dimension is obtained based on the vector representation of the dimension and the vector representation of the prior dimension of the dimension, it may utilize one or more dimensions among the prior dimensions of the dimension. For example, it may obtain the hidden layer representation corresponding to the dimension based on the vector representation of the dimension and the vector representations of the previous one or more dimensions of the multi-dimension. As an alternative, vector representations of all dimensions before the dimension may be utilized.

It is clear to those skilled in the art that an encoding result of a voice segment is a hidden vector (or hidden layer vector) corresponding to the voice segment, and may also be referred to as a semantic vector of the voice segment, and a feature vector is substantially a hidden layer vector.

In an embodiment, when the feature vector is further processed to obtain a semantic vector as an encoding output, the vector representation of each dimension of the feature vector may be determined based on the vector representation of the dimension and the vector representation of the prior dimension of the dimension. Based on the solution, when determining the hidden layer representation corresponding to each moment (the time sequence information corresponding to the dimension), since the determination of the hidden layer representation at the moment may be independent of the hidden layer representation of the previous moment, the determination of the hidden layer representation corresponding to each dimension may be performed in parallel. Compared with a processing mode in a voice encoding mode (such as a long short-term memory network), it may reduce time complexity of the voice encoding process from O(n) to constant complexity, which significantly reduces encoding time complexity and increase processing speed.

In an embodiment, the performing voice encoding on the voice feature of each voice segment to obtain an encoding result of each voice segment may include obtaining the encoding result of each voice segment through a residual network based on the voice feature of each voice segment.

In an embodiment, the residual network may include at least one residual unit, that is, the number of residual units in the residual network may be one or more. When the number of residual units is one, the input of the residual unit is a voice feature, and the output of the residual unit may be a vector obtained by connecting the hidden vector with the feature vector, and the vector representation of each dimension of the hidden vector may be a hidden layer representation corresponding to each dimension of the feature vector. When there are plurality of residual units, the input of each residual unit may be an output of the previous residual unit, and an output of the last residual unit may be an output of the encoder.

In an embodiment, when the encoding result of each voice segment is obtained through the residual network, it may be implemented by a residual network with an attention mechanism to improve the encoding effect.

In an embodiment, when the encoding result of each voice segment is obtained through a network with attention mechanism (i.e., the first attention network below), the network may be implemented by using a residual network, or may be implemented by using other network structure.

In an embodiment, when the encoding result is obtained through a residual network with a attention mechanism (of course, it also may be referred to as a network with an attention mechanism), the obtaining a hidden layer representation corresponding to a dimension based on a vector representation of each dimension and a vector representation of the prior dimension of the dimension in the feature vector of each voice segment by the residual network may include, for each dimension of the feature vector, obtaining the hidden layer representation corresponding to each dimension based on the vector representation of the dimension, a weight of the dimension, used vector representation of each prior dimension of the dimension, and a weight of each prior dimension.

In an embodiment, for each dimension of the feature vector, obtaining the hidden layer representation corresponding to each dimension based on the vector representation of the dimension, a weight of the dimension, the used vector representation of each prior dimension of the dimension, and the weight of each prior dimension may include determining, by a first attention network, a weight of the dimension and a weight of each prior dimension of the dimension based on the vector representation of the dimension and the vector representation of each prior dimension of the dimension, and weighting and merging the vector representation of the dimension and the vector representation of each prior dimension of the dimension based on the weight of the dimension and the weight of each prior dimension, to obtain the hidden layer representation corresponding to the dimension.

The obtaining the encoding result of each voice segment based on the feature vector of each voice segment may be referred to as a causal attention mechanism. The mechanism is further described in detail below by referring to FIG. 9.

Figure 9:
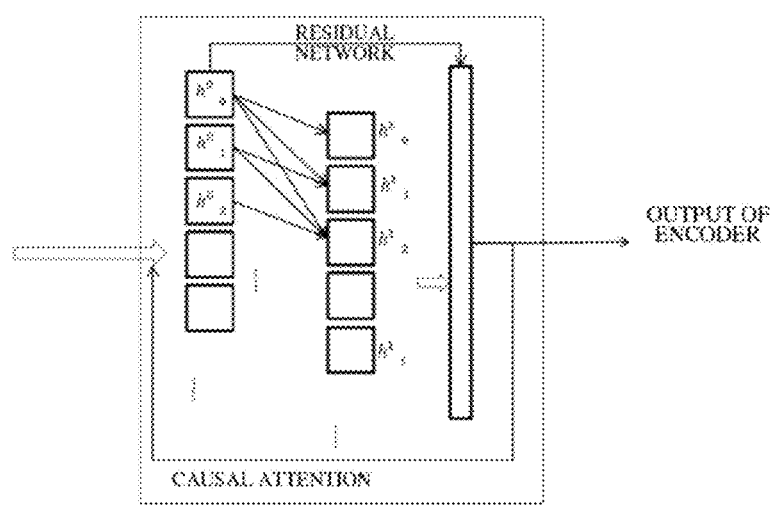
FIG. 9 illustrates a schematic structural diagram of a causal attention mechanism according to an embodiment.

FIG. 9 illustrates a schematic diagram of a principle of causal attention mechanism according to an embodiment. As shown in the figure, a neural network may be a residual network, and only one residual unit is shown in the figure, but is not limited thereto. For example, there may be plurality of residual units. The causal attention mechanism may include at least one of following operations.

Operation 1: inputting a hidden layer vector $h_i^{l-1}$, and obtaining $h_i^l$ through the following equation $$h_i^l = \text{softmax}\left(\frac{W_q h_i^{l-1} W_k h_{<i}^{l-1}}{Z}\right) W_v h_{<i}^{l-1},$$

where $W_q$, $W_k$, $W_v$ are weights in the attention mechanism, and arrows in the figure of causal attention may be understood as a respective weight, $h_i^{l-1}$ represents an $i^{th}$ (that is, an $i^{th}$ moment) vector representation of an input vector of an l layer, and $h_{<i}^{l-1}$ represents vector representation of all moments before the $i^{th}$ moment, $h_o^l$ represents an $i^{th}$ hidden layer unit of the l layer (i.e., the foregoing hidden layer representation), and Z is a normalization parameter, which is a constant used for normalization. As shown in FIG. 9, when l is 1, l–1 is 0, $h_i^{l-1}$ may be $h_0^0, h_1^0, h_2^0, \ldots$, and $h_o^l$ may be $h_0^1, h_1^1, h_2^1, \ldots,$ .

In an embodiment, l may be understood as the number of layers of the residual unit of the residual network, and $W_q$, $W_k$, and $W_v$ are the weights corresponding to the respective vector representations, and the specific values of the weights may be determined by training the network, and the weights of the respective attention mechanisms used by different residual units may be the same or different. The $h_i^l$ is the hidden layer representation corresponding to $h_i^{l-1}$, l–1 and l represent a corresponding input and output. For example, as shown in the figure, when there is only one residual unit in the residual network, $h_0^0, h_1^0, h_2^0, \ldots$, represent vector representation of each dimension in the feature vector. Correspondingly, $h_0^1, h_1^1, h_2^1, \ldots$, are the hidden layer representation corresponding to $h_0^0, h_1^0, h_2^0, \ldots$, respectively.

Operation 2: $h_i^l$ and $h_i^{l-1}$ are connected by the residual network to generate a new hidden layer representation, that is, an output of the residual unit. When there is one residual unit, the new hidden layer representation is the encoding result; when there are two or more residual units, starting from the second residual unit, the input of the residual unit is an output of the previous residual unit. For example, assuming that the number of the residual units are two, the causal mechanisms may further include at least one of following operations.

Operation 3: taking the output of operation 2 as the input of operation 1, and performing operation 1 and operation 2 again until obtaining the output of the last residual unit.

Generally, in an embodiment, the number of residual units of the residual network may be set as two or three.

In an embodiment, after obtaining a text of a target language (referred to as a target text) corresponding to each voice segment of a voice signal, the target text corresponding to each voice segment may be combined to obtain a final translated text of the voice signal. It can be understood that the target texts corresponding to the respective voice segments are combined to obtain the final translated text. After preliminary combination of the target texts, error correction may be performed on the preliminary combined text, and the error-corrected text may be used as the final translated text. For example, for the segment 1 in the previous example, the target text is a Chinese text ( 可能 ) corresponding to "maybe", and for the segment 2, the target text is Chinese text ( 可能是一只猫 ) corresponding to "maybe a cat", and the preliminary combined text is Chinese text ( 可能可能是一只猫 ) corresponding to "maybe maybe a cat", then the preliminary combination result may be performed error correction to obtain the final translated text of Chinese text ( 可能是一只猫 ) corresponding to "maybe a cat".

In an embodiment, after obtaining the encoding result of each voice segment, in operation S130, decoding the encoding result of each voice segment to obtain a text of the target language corresponding to each voice segment may include, for each voice segment, obtaining the text of the target language corresponding to the voice segment based on the encoding result of the voice segment and its prior voice segment (i.e., the text of the target language corresponding to the previous voice segment is the target text).

That is, for a voice segment, the decoding result of the voice segment may be obtained based on the decoding result of its prior voice segment and the encoding result of the voice segment. Since the semantics between the voice segments are usually related, when the encoding result of the current voice segment is decoded, the decoded text may be used to assist in decoding the encoding result of the current voice segment, and improve the decoding accuracy.

It can be understood that, for a voice segment, its prior voice segment may be one or more voice segments preceding the voice segment. As an alternative, the prior voice segment may be the previous voice segment of the voice segment, that is, the last voice segment.

In an embodiment, for each voice segment, obtaining the text of the target language corresponding to each voice segment based on the encoding result of the voice segment and its prior voice segment may include, for each voice segment, determining, by a second attention network, a feature vector of a text of the target language corresponding to each prior voice segment of each voice segment, and a weight of the feature vector of the text of the target language corresponding to each prior voice segment, and weighting and merging the feature vectors of the text of the target language corresponding to each prior voice segment based on respective weights to obtain a weighted and merged feature vector.

In an embodiment the obtaining the text of the target language corresponding to each voice segment base on the encoding result of the voice segment and its prior voice segment may include obtaining the text of the target language corresponding to the voice segment based on the encoding result of the voice segment and the weighted and merged feature vector.

That is, a network with attention mechanism (i.e., the above-mentioned second attention network) may be used on the decoding end, and the feature vector of the target text of each prior voice segment and the corresponding weight may be obtained through the network. In an embodiment, each feature vector may have a weight based on respective weights to obtain a merged feature vector. For example, for a voice segment, when its prior voice segment is a previous voice segment of the voice segment, the feature vector of the target text of the previous voice segment may be obtained through the second attention network, and the weighted feature vector may be obtained by attention. Then, the decoding result of the voice segment may be obtained based on the weighted feature vector and the encoding result of the voice segment, that is, the target text corresponding to the voice segment.

In an embodiment, the first attention network may have the same model parameters of corresponding network layer as that of the second attention network.

That is, when the network with the attention mechanism is used on both the encoding end and the decoding end, the corresponding network layers of the two attention networks may use the same model parameters. In an embodiment, the first attention network and the second attention network may be a single layer network structure or a multi-layer network structure. When the first attention network and the second attention network are multi-layer network structures, the corresponding layers may have the same model parameters, that is, a model parameter of an $i^{th}$ layer of the first attention network is the same as the model parameter of the $i^{th}$ layer of the second attention network, wherein the $i^{th}$ layer is any layer of the network.

In an embodiment, the corresponding network layers of the first attention network and the second attention network may use the same model parameters, which may significantly reduce model parameters of the entire voice translation model. Since the model parameters are significantly reduced, it may effectively reduce memory consumption when performing online voice translation by using the model. In addition, by sharing the model parameters in the voice encoding end and the text decoding end, it may enhance association between voice encoding and text decoding, shorten the gradient propagation path during model training, and achieve fast and stable training. By sharing network parameters, it may take a full advantage of a limited model capacity to train a more compact model for meeting online memory requirements. In addition, compared with other networks, it may train a deeper network by sharing network parameters under the same memory limit.

Embodiments will be described by referring to FIG. 10 to describe a voice translation system architecture.

Figure 10:
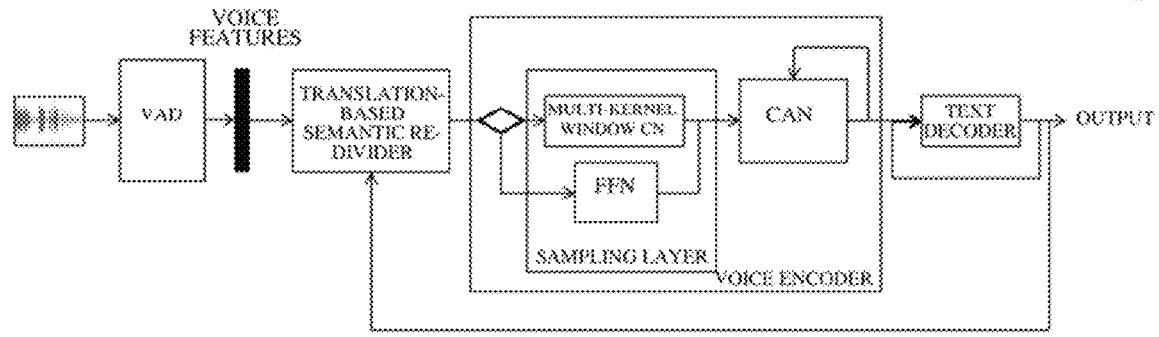
FIG. 10 illustrates a schematic diagram of the overall architecture of a voice translation system according to an embodiment.

FIG. 10 illustrates a schematic structural diagram of a voice translation system according to an embodiment. As shown in the figure, the system architecture may include a voice activity detection (VAD) module, a translation semantics-based re-divider, a long short-time splitter (shown in rhombus), a voice encoder and a text decoder. In an embodiment, the voice encoder may include a sampling layer and a causal attention mechanism (a causal attention network (CAN) shown in the figure) but is not limited thereto, the sampling layer may include a multi-kernel window convolution network (CN) and a feedforward network (FFN), but is not limited thereto. In an embodiment, the semantic-based re-divider may be the re-divider shown in FIG. 4 or the re-divider shown in FIG. 5, but is not limited thereto. When performing voice translation based on the system, a processing flow thereof may mainly include at least one of following operations.

Operation 1: After the system receives a voice signal to be translated (the signal shown on the leftmost of the figure), the voice signal may be divided into plurality of voice segments through a VAD module, and voice features may be extracted from all of the voice segments, where voice features may be extracted in T×F dimensions from each voice segment, where T represents a voice length, F represents the number of frequency channels, and a voice feature obtained from an $i^{th}$ voice segment is represented by $T_i \times F_i$.

In an embodiment, the voice length may be a product of the number of frames of a signal included in the voice segment and a length of each frame. In an embodiment, the number of frames of the signal included in the voice segment may also be used to represent the voice length of the voice segment.

Operation 2: For the first voice segment obtained by performing segmentation, since the voice segment does not have a prior voice segment, an input and an output of the re-divider may be the voice features of the voice segment.

For each of voice segments behind a first voice segment (represented by a segment i), an output hidden layer of the text decoder for a segment i−1 and a voice feature of the segment i are together input to the translation-based re-divider, and the output of the re-divider may be taken as a new voice feature of the segment i (it may be the voice feature of the segment i, or may be the feature obtained by combining the voice feature of the segment i−1 and the voice feature of the segment i) for subsequent processing.

It should be noted that although the output of the text decoder which is input to the re-divider shown in the figure is the output of the text decoder, it can be understood that the output of the text decoder which is input to the re-divider is substantially the output of the last hidden layer of the text decoder.

Operation 3: the segment feature generated in operation 2 (i.e., the voice feature of the segment) may be encoded by the voice encoder to obtain the voice encoding output. The voice encoder may include a long short-term splitter (shown by a rhombus in the figure), and a sampling layer and a causal attention layer (the causal attention network shown in the figure), but is not limited thereto. The long short-term splitter may send the voice feature of which a voice length is greater than a threshold to the multi-kernel window-based convolutional network, and send the voice feature of which the voice length is not greater than the threshold to the feedforward network layer. The sampling layer may include the multi-kernel window convolution network and the feedforward network layer, but is not limited thereto.

Operation 4: the output generated by operation 3 may be input into the text decoder to generate a target translation, and the output hidden layer of the text decoder corresponding to the current voice segment may be input into the re-divider of the next voice segment.

It should be noted that the specific structure of the text decoder may be configured according to actual requirements. The structure of the text decoder is further described by referring to FIG. 11A.

Figure 11A:
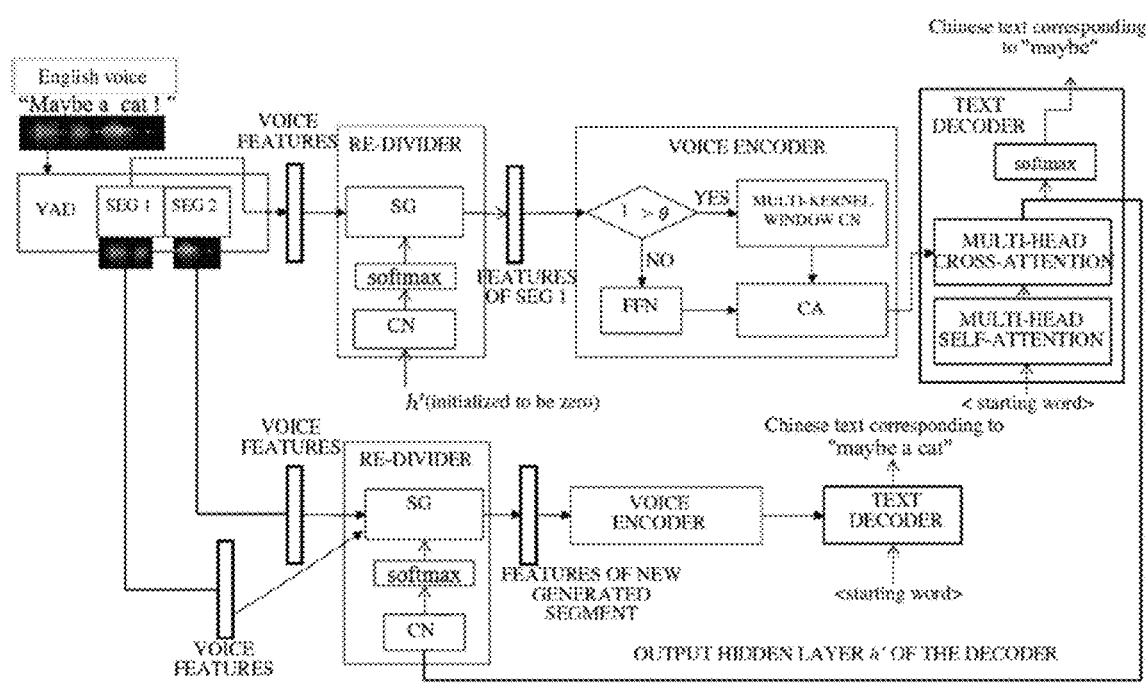
FIG. 11A illustrates a schematic structural diagram of a voice translation system according to another embodiment.

As shown in FIG. 11A, a schematic structural diagram of a system architecture shown in FIG. 10 is provided. In an embodiment, the re-divider may include a classifier and a segment generator (SG), but is not limited thereto. In an embodiment, the classifier may be the classifier 410 shown in FIG. 4 or the classifier 510 shown in FIG. 5. The long short-term splitter of the voice encoder may be a judger, and the causal attention (CA) shown in the figure may be the causal attention mechanism. The text decoder may include a multi-head attention layer (i.e., a second attention network in this example), a multi-head cross-attention layer, and a softmax layer that may be cascaded sequentially.

Process of voice translation in combination with the system architecture may include at least one of following operations.

Operation 1: after the system receives a voice (i.e., a voice signal to be translated), the voice may be divided into a plurality of voice segments by a voice activity detection, such as a segment 1 and a segment 2 shown in the figure, and voice features may be extracted from all of the segments respectively, and for example, the voice feature of the segment 1 may be obtained in $T_1 \times F_1$ dimensions, and the voice feature of the segment 2 may be obtained in $T_2 \times F_2$ dimensions. As shown in the figure, the voice signal to be translated is an English voice of "Maybe a cat!", that is, the source language is English, and the target language is Chinese.

Operation 2: the voice feature of the segment 1 may be input into the re-divider. Since segment 1 is the starting segment, the initialization parameter of the re-divider (the output hidden layer of the text decoder, i.e., h' shown in the figure) is zero, and the re-divider may directly output the segment 1 and corresponding voice features.

Operation 3: the voice feature of the segment 1 may be input into the voice encoder. When the voice length is greater than θ (which is the length threshold in this example), the voice feature may be processed by the multi-kernel window convolution network (CN). When the length is not greater than θ, after the feedforward network layer, the feature vector output by the convolution network (CN) or the feedforward network (FFN) may be processed by the causal attention layer (i.e., the first attention network in this example) to obtain the encoding result corresponding to the segment 1 (i.e., the output of the encoder).

Operation 4: for the segment 1, after the output of the encoder is decoded by the text decoder to obtain a text of the target language (Chinese), "可能", corresponding to translation of "maybe", and the output hidden layer h' of the decoder is input into the re-divider of the next segment.

Wherein, a starting word shown in the figure is a starting identifier of the text decoder operating, and may be a preset word.

As shown in FIG. 11A, the text decoder may include a multi-head self-attention layer, a multi-head cross-attention layer, and a softmax layer that are sequentially cascaded, but is not limited thereto. In an embodiment, for a first voice segment, such as the segment 1, the input of the multi-head self-attention layer may be the starting word, and for the other voice segments except the first voice segment, the input of multi-head self-attention may be a decoding result of a previous voice segment of a current voice segment. For example, for the segment 2, an input of the multi-head self-attention may be a decoding result of the segment 1, "可能", and the multi-head self-attention layer may be specifically used for performing attention weighting processing on an information feature (representation vector) of input information to obtain a processed representation vector.

For the multi-head cross-attention layer, the input may include an encoding result of each voice segment (i.e., an encoding vector), and an output of the multi-head self-attention layer corresponding to each voice segment. In an embodiment, for the current voice segment, the multi-head cross-attention layer may be used for attention weighting and merging the encoding result of the current voice segment, and the output of the multi-head self-attention layer corresponding to the output of the current voice segment (the input of the multi-head self-attention layer may be the decoding result corresponding to the previous voice segment of the current voice segment) to obtain the merged vector, and the merged vector may be input to the softmax layer, and the softmax layer may process the merged vector to obtain a decoding result of the current voice segment.

In an embodiment, for the segment 1, the input of the multi-head self-attention layer of the text decoder may be a starting word, and an output of the multi-head self-attention layer and the encoding result of the segment 1 may be an input of the multi-head cross-attention layer. The softmax layer may obtain the decoding result of segment 1 (i.e., "可能") based on the merged vector output by the multi-head cross-attention layer; for segment 2, the input of the multi-head self-attention layer is "可能", and the output of the multi-head self-attention layer and an encoding result of the segment 2 may be the input of the multi-head cross-attention layer, and the softmax layer may obtain a decoding result of the segment 2 (i.e., "是一只猫!") based on the merged vector output by the multi-head cross-attention layer.

It should be noted that, in an embodiment, when both the voice encoder and the text decoder include the attention network, such as the causal attention of the voice encoder and the multi-head self-attention layer of the text decoder shown in FIG. 11A, the two network structures may use the same model parameters or different network parameters. It may be understood that when the two network structures use the same model parameters, when both the attention layers of the voice encoder and the text decoder are multi-layer network structures (such as plurality of residual units), one layer among the causal attention layers of the voice encoder may have the same model parameters as the corresponding layer among the self-attention layers of the text decoder, that is, the model parameters of an $i^{th}$ layer among the causal attention layers of the voice encoder may be shared by the $i^{th}$ layer among the multi-head self-attention layers of the text decoder.

Figure 11B:
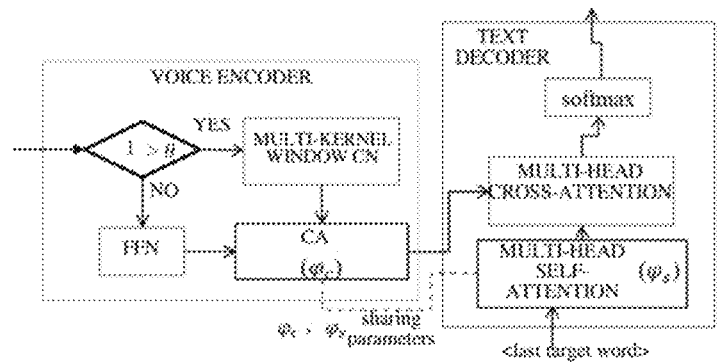
FIG. 11B illustrates a schematic structural diagram of a voice encoder and a text decoder of a voice encoding system according to another embodiment.

FIG. 11B illustrates a schematic structural diagram of a voice encoder and a text decoder, causal attention layers of the voice encoder and multi-head self-attention layers of the text decoder shown in the figure may share network parameters, that is, the model parameter $\varphi_c$ of causal attention and the model parameter $\varphi_s$ of the multi-head self-attention layer are shared, that is, the two model parameters can be the same. The "previous target word" shown in the figure is "the decoding result of the previous voice segment", which corresponds to the starting word shown in FIG. 11A. For the first voice segment, the starting word is a preset word, and for the voice segments other than the first voice segment, the starting word is the decoding result corresponding to the previous voice segment.

The attention layer of the voice encoder and the attention layer of the text decoder may use the same network parameters, which may significantly reduce the model parameters of the entire voice translation model. Since the model parameters are significantly reduced, it may effectively reduce memory consumption of the device when performing online voice translation by using the model. In addition, by sharing the network parameters in the voice encoder and the text decoder, it may enhance association between the voice encoder and the text decoder, shorten a gradient propagation path during model training, and achieve fast and stable training. By sharing the network parameters, it may take a full advantage of a limited model capacity to train a more compact model for meeting online memory requirements. In addition, compared with other networks, it may train a deeper network by sharing network parameters under the same memory limit.

Operation 5: for the segment 2, the voice feature of the segment 2 and the decoding output hidden layer of the segment 1 may be input into the re-divider to generate a new feature. When the output hidden layer of segment 1 is determined to be semantically incomplete, the segment generator may combine the segment 1 with the segment 2, that is, the voice feature of the segment 1 and the voice feature of the segment 2 may be combined and output. When the output hidden layer of the segment 1 is determined to be complete, the voice feature of the segment 2 may be directly output.

Operation 6: the newly generated segment feature may be processed by the voice encoder and the text decoder to obtain the text of the target language, "可能是一只猫", corresponding to translation of "maybe a cat!". At this time, for the segment 2, the starting word as the input of the text decoder may be the translation of the segment 1 (maybe), that is, "可能".

It can be understood that, in this example, processing of the segment 1 and the segment 2 may be respectively shown for ease of understanding. In an embodiment, for each of the voice segments, the re-divider, the voice encoder, and the text decoder may be the same structure.

A method according to the above embodiments and an existing voice translation system (such as the system shown in FIG. 1 and FIG. 2A) are tested by correlated experiments on the English-German IWSLT2018 voice translation data set. The experimental results are shown in Table 1 below.

TABLE 1

|  | BLEU | Encoder Delay (Output/Input) |
|---|---|---|
| Existing System (CNN + BiLSTM) | 10.24 | 0.2 s |
| Method of Embodiments | 15.44 | 0.006 |

Bilingual evaluation understudy (BLEU) indicates a translation quality evaluation standard, where the higher the score, the higher the translation quality, and the encoder delay (output/input) represents a time required to encode one second of a voice. It can be seen from the results shown in the Table 1 that the voice translation quality and the voice translation efficiency are significantly improved by the method according to the above embodiments. The method according to the above embodiments meet the actual voice translation requirements, especially in the real-time dialogue system, which can significantly improve the effect of real-time voice translation and enhance the user's perception.

Table 2 shows that the translation model (including the voice encoder and the text decoder) shown in FIG. 10 and the translation model shown in FIG. 11B are respectively used to perform tests in the TST2013 (TST13 shown in the table) data set and the TST2014 (TST14 shown in the table) data set, the test results are shown in Table 2 below.

TABLE 2

|  | Translation Quality | | Model Size & Capacity | |
|---|---|---|---|---|
|  | TST13-BLEU | TST14-BLEU | Minimum Parameter | Maximum Depth |
| Method shown in FIG. 10 | 15.44 | 14.12 | 67M | 6 layers |
| Method shown in FIG. 11B | 15.55 | 14.93 | 49M | 9 layers |

It can be seen from Table 2 that the method of sharing model parameter provided in FIG. 11B may reduce the number of independent parameters, thereby saving a memory capacity. As shown in the solution of FIG. 10, the minimum parameter amount of the translation model is 67M (i.e., 67×10$^6$), and in the solution shown in FIG. 11B, the minimum parameter amount of the translation model may be reduced to 49M. Under the same memory size limit, the method provided in FIG. 11B may further increase the model capacity and enhance the model depth, thereby further improving the quality of translation.

According to an embodiment, a semantic re-dividing-based end-to-end voice translation framework may be provided.

The method according to the embodiment may differ from conventional ones in that the method according to the embodiment integrates a semantic integrity of a translation-based re-dividing module into an end-to-end voice translation framework according to an embodiment, which is convenient for dynamically adjusting a voice input according to translated content in a real-time voice translation system, so as to ensure that input voice features are more semantically complete.

According to an embodiment, a translation semantic-based re-divider is provided.

According to an embodiment, a re-dividing method which is based on the semantic integrity of the translation, which reorganizes that incomplete voice segments may be provided to reduce translation errors caused by incomplete segments.

According to an embodiment, a sampling layer which is based on a long short-term control and multi-kernel window may be provided.

The method according to the embodiment may differ from the conventional ones in that the method according to the embodiment uses a long short-term control splitter according to an embodiment. For a voice segment of which the voice length is less than the threshold, its voice features may not be processed by a sampling layer in order to avoid excessive loss of information, and for a voice segment of which the voice length is higher than the threshold, its voice features may undergo convolution sampling based on multi-kernel windows, wherein the multi-kernel windows may ensure that there is one window capturing the complete phoneme in the case of a variable voice speed.

According to an embodiment, a causal attention mechanism in the end-to-end voice translation encoder may be provided.

According to an embodiment, a causal attention mechanism may be used in the voice encoder instead of the long short-term memory network, and it may reduce the encoding time complexity from O(n) to constant complexity, and increase the processing speed.

According to an embodiment, a mechanism of sharing the attention layer in the end-to-end voice translation encoder and the end-to-end voice translation decoder may be provided.

According to an embodiment, the parameters of the causal attention layer may be shared in the voice encoder and the parameters of the multi-head attention layer in the decoder, thereby saving the memory space occupied by the online operation and shortening the connection path of the voice feature and the text feature, which is conducive to network stability.

Figure 12:
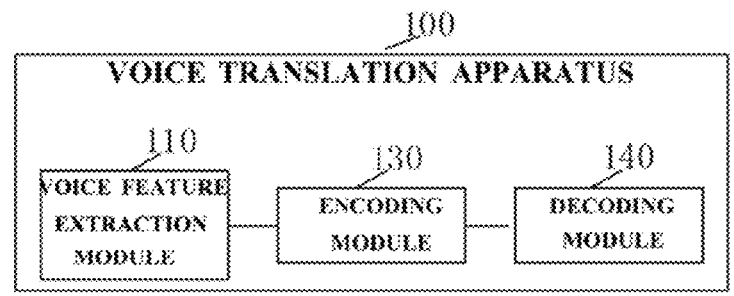
FIG. 12 illustrates a schematic structural diagram of a voice translation apparatus according to an embodiment.

Based on the same principle as the voice translation method shown in FIG. 3, a voice translation apparatus may be provided according to an embodiment. As shown in FIG. 12, the voice translation apparatus 100 may include a voice feature extraction module 110 and an encoding module 130 and a decoding module 140.

The voice feature extraction module 110 may be configured to divide a voice signal to be translated, and extract a voice feature of each voice segment obtained by dividing.

The encoding module 130 may be configured to perform voice encoding on the voice feature of each voice segment to obtain an encoding result of each voice segment.

The decoding module 140 may be configured to decode the encoding result of each voice segment to obtain a text of a target language corresponding to each voice segment.

Figure 13:
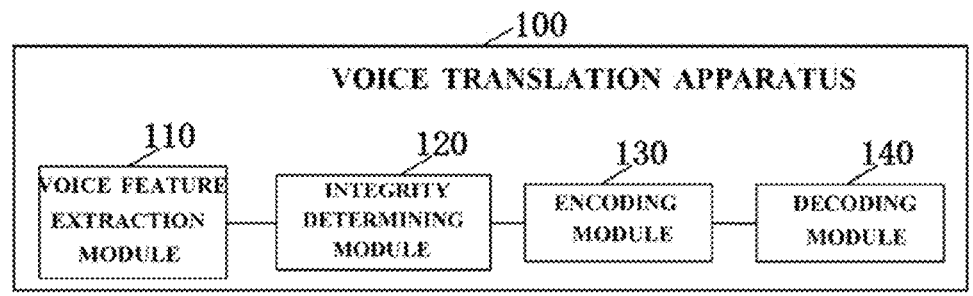
FIG. 13 illustrates a schematic structural diagram of a voice translation apparatus according to another embodiment.

In an embodiment, as shown in FIG. 13, the apparatus 100 may further include a semantic integrity determining module 120, and the semantic integrity determining module 120 may be configured to determine, for each voice segment, a semantic integrity of a prior segment of a voice segment.

The encoding module 130 is configured to, when the semantics of the prior voice segment of the voice segment is incomplete, combine the voice segment with the prior voice segment of the voice segment and performing voice encoding on a voice feature corresponding to the combined voice segment to obtain an encoding result of the combined voice segment, and, when the semantics of the prior voice segment of the voice segment is complete, perform voice encoding on the voice feature of the voice segment to obtain an encoding result of the voice segment.

When the encoding module 130 combines the voice segment and the prior voice segment of the voice segment and performing the voice encoding on a voice feature corresponding to the combined voice segment to obtain an encoding result of the combined voice segment, the encoding module 130 may be configured to combine the voice feature of the voice segment with the voice feature of the prior voice segment of the voice segment to obtain a combined voice feature, using the combined voice feature as the voice feature of the combined voice segment, and perform voice encoding on the combined voice feature to obtain an encoding result of the voice segment.

In an embodiment, the semantic integrity determining module 120 determines semantic integrity of a prior voice segment of the voice segment, by determining the semantic integrity of the prior voice segment of the voice segment based on semantic features of the prior voice segment of the voice segment, or determining the semantic integrity of the prior voice segment of the voice segment based on the voice feature of the voice segment and the semantic features of the prior voice segment of the voice segment.

In an embodiment, the encoding module 130 may be configured to determine a feature vector of each voice segment based on the voice feature of each voice segment, and obtain the encoding result of each voice segment based on the feature vector of each voice segment.

In an embodiment, when the encoding module 130 is configured to determine the feature vector of each voice segment according to the voice feature of each voice segment, the encoding module 130 may be configured to, for each voice segment, extract the voice feature of each voice segment based on at least two convolution processing parameters, and map the feature extracted based on the at least two convolution processing parameters to obtain the feature vector.

In an embodiment, when the encoding module 130 extracts the voice feature of each voice segment based on at least two convolution processing parameters, and maps the feature extracted based on the at least two convolution processing parameters to obtain the feature vector, the encoding module 130 may be configured to determine a voice length of the voice segment, when the voice length is greater than a length threshold, extract the voice feature of each voice segment based on at least two convolution processing parameters, and map the feature extracted based on the at least two convolution processing parameters to obtain the feature vector, and, when the length of the voice is not greater than the length threshold, merge the voice features of the voice segment to obtain the feature vector.

In an embodiment, when the encoding module 130 extracts the voice feature of each voice segment based on at least two convolution processing parameters, and maps the feature extracted based on the at least two convolution processing parameters to obtain the feature vector, it is configured to extract the voice feature of each of the encoding module 130 plurality of voice segments by at least two convolution processing parameters, and down-sampling the extracted voice feature, and map the down-sampled features.

In an embodiment, the length threshold may be determined based on at least one of a down-sampling rate, the number of down-sampling, and the convolution processing parameter.

When the encoding module 130 extracts the voice feature of each voice segment by at least two convolution processing parameters, the encoding module 130 may be configured to:

extract the voice feature of each voice segment by at least one convolution layer, wherein the at least one convolution layer comprises at least two convolution processing parameters.

In an embodiment, the convolution processing parameter may be determined based on at least one of the following information:

voice speed information of a source language corresponding to the voice signal to be translated, and a rate of extracting the voice feature of each voice segment obtained by dividing, and wherein the voice speed information includes at least one of an average voice speed, a slowest voice speed, and a fastest voice speed.

In an embodiment, the convolution processing parameters may include the size of the convolution kernel.

In an embodiment, when the encoding module 130 obtains the encoding result of each voice segment based on the feature vector of each voice segment, the encoding module 130 may be configured to, for each voice segment, obtain a hidden layer representation corresponding to a dimension based on a vector representation of each dimension and a vector representation of the prior voice segment of the dimension in the feature vector of each voice segment, and obtain the encoding result of each voice segment based on the hidden layer representation corresponding to each dimension in the feature vector of the voice segment.

In an embodiment, when the encoding module 130 obtains a hidden layer representation corresponding to a dimension based on a vector representation of each dimension and a vector representation of the prior dimension of the dimension in the feature vector of each voice segment, the encoding module 130 may be configured to, for each dimension in the feature vector of the voice segment, obtain the hidden layer representation corresponding to the each dimension in the feature vector of the voice segment based on the vector representation of the dimension, a weight of the dimension, the vector representation of each prior dimension of the dimension, and the weight of each prior dimension.

In an embodiment, when the encoding module 130 performs voice encoding on the voice feature of each voice segment to obtain an encoding result of each voice segment, the encoding module 130 may be configured to obtain the encoding result of each voice segment through a residual network based on the voice feature of each voice segment, wherein the residual network includes at least one residual unit.

In an embodiment, for each dimension in the feature vector of the voice segment, when the encoding module 130 obtains the hidden layer representation corresponding to the each dimension in the feature vector of the voice segment based on the vector representation of the dimension, a weight of the dimension, the vector representation of each prior dimension of the dimension, and the weight of each prior dimension, the encoding module 130 may be configured to determine, by a first attention network, the weight of the dimension and the weight of each prior dimension of the dimension based on the vector representation of the dimension and the vector representation of each prior dimension of the dimension, and weight and merge the vector representation of the dimension and the vector representation of each prior dimension of the dimension based on the weight of the dimension and the weight of each prior dimension, to obtain the hidden layer representation corresponding to the dimension.

When the decoding module 140 decodes the encoded result of each voice segment to obtain the text of the target language corresponding to each voice segment, the decoding module 140 may be configured to determine, by a second attention network, a feature vector of a text of the target language corresponding to each prior voice segment of each voice segment, and a weight of the feature vector of the text of the target language corresponding to each prior voice segment, weight and merge the feature vectors of the text of the target language corresponding to each prior voice segment based on respective weights to obtain a weighted and merged feature vector, and obtain the text of the target language corresponding to the voice segment based on the encoding result of the voice segment and the weighted and merged feature vector, wherein the first attention network has the same model parameters of corresponding network layer as that of the second attention network.

It should be understood that modules of a voice translation apparatus according to the above embodiments may have the functions of implementing the corresponding operations in the voice translation method described above. The function can be implemented by a hardware, or a corresponding software executed by the hardware. Each of the above modules may be a software and/or a hardware, and each module may be implemented separately or integrated by plurality of modules. For a description of the function of each module of the voice translation device, please refer to the corresponding description in the voice translation method in the foregoing embodiments, and details are not described herein again.

In addition, the functional modules of the voice translation apparatus may be operated in the terminal device and/or the server according to actual application requirements.

Based on embodiments explained by referring to FIG. 3, an electronic device may be provided, which may include a memory and a processor; wherein the memory stores a computer program; the processor may invoke the computer program to perform the voice translation method provided in any of embodiments.

A computer readable storage medium may be further provided according to an embodiment, wherein the storage medium stores computer programs, that when executed by a processor, cause a computer to implement the voice translation method provided in any embodiment.

Figure 14:
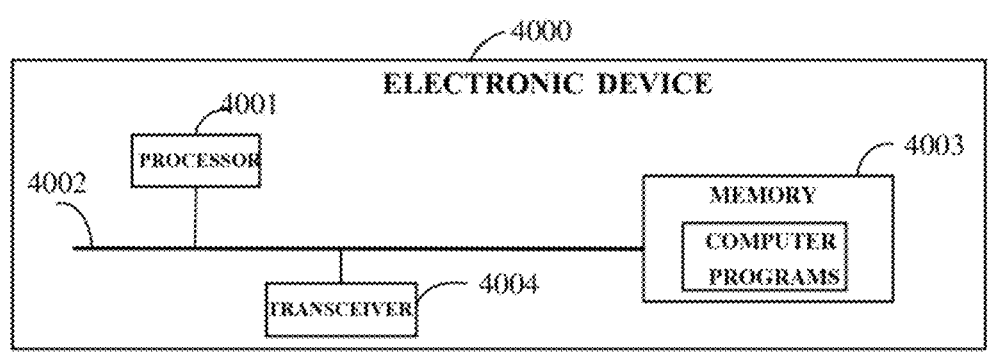
FIG. 14 illustrates a schematic structural diagram of an electronic device according to an embodiment.

As an alternative, FIG. 14 illustrates a schematic structural diagram of an electronic device according to an embodiment. As shown in FIG. 14, the electronic device 4000 may include a processor 4001 and a memory 4003. The processor 4001 may be connected with the memory 4003 through for example, the bus 4002. In an embodiment, the electronic device 4000 may further include a transceiver 4004. It should be noted that, in an embodiment, the number of transceivers 4004 is not limited to one, and the structure of the electronic device 4000 does not constitute a limitation.

The processor 4001 may be a central processing unit (CPU), a general-purpose processor, a digital signal processor (DSP), an application-specific integrated circuit (ASIC), a field programmable gate array (FPGA) or other programmable logic device, a transistor logic device, a hardware component, or any combination thereof. It is possible to implement or carry out the various exemplary logical blocks, modules and circuits described in connection with the disclosure. The processor 4001 may also be a combination of computing functions, such as a combination of one or more microprocessors, a combination of a DSP and a microprocessor, and the like.

Bus 4002 may include a path for communicating information between the above components. The bus 4002 may be a peripheral component interconnect (PCI) bus or an extended industry standard architecture (EISA) bus, and the like. The bus 4002 may be divided into an address bus, a data bus, a control bus, and the like. For ease of illustration, only one thick line is shown in FIG. 14, but it does not mean that there is only one bus or one type of bus.

The memory 4003 may be a read only memory (ROM) or other type of static storage device that can store static information and instructions, random access memory (RAM) or other types of dynamic storage device that can store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that can be used to carry or store desired program codes in the form of instructions or data structures and can be accessed by a computer, but not limited to this.

The memory 4003 may store a computer program that executes the solution, and is controlled by the processor 4001 for execution. The processor 4001 is configured to execute a computer program stored in the memory 4003 to implement the content shown in any of the foregoing method embodiments.

Moreover, it should be understood that various units according to an embodiment may be implemented as hardware components and/or software components. Those skilled in the art can implement the various units, for example, using an FPGA or an ASIC, depending on the processing performed by the various defined units.

Further, embodiments may be implemented as computer codes in a computer readable recording medium by those skilled in the art according to the disclosure. The computer codes are carried out when the computer codes are executed in a computer.

Although the disclosure has been described with various embodiments, various changes and modifications may be suggested to one skilled in the art. It is intended that the disclosure encompass such changes and modifications as fall within the scope of the appended claims.

What is claimed is:

1. A method for voice translation, the method comprising:
    receiving a voice signal of a first language;
    obtaining a plurality of voice segments forming the voice signal, the plurality of voice segments comprising a first voice segment and a second voice segment, the first voice segment being a voice segment prior to the second voice segment in a time sequence;
    determining whether the first voice segment is semantically complete or incomplete by determining a semantic integrity of the first voice segment with respect to the second voice segment based on a voice feature of the first voice segment and a voice feature of the second voice segment;
    obtaining an output voice segment based on a determination that the first voice segment is semantically complete or incomplete; and
    outputting a text in a second language corresponding to the voice signal of the first language based on the output voice segment.

2. The method of claim 1, wherein the semantic integrity of the first voice segment indicates a semantic correlativity between the first voice segment and the second voice segment.

3. The method of claim 1, wherein the semantic integrity of the first voice segment indicates the first voice segment constitutes a full sentence.

4. The method of claim 1, wherein the semantic integrity of the first voice segment is associated with a probability of the semantic integrity of the first voice segment.

5. The method of claim 1, wherein the output voice segment is a translation unit for translating the first language into the second language.

6. The method of claim 1, wherein the second voice segment is obtained as the output voice segment based on a determination that the first voice segment is semantically complete.

7. The method of claim 1, wherein the first voice segment and the second voice segment are obtained as the output voice segment based on a determination that the first voice segment is semantically incomplete.

8. The method of claim 7, wherein the voice feature of the first voice segment and the voice feature of the second voice segment are combined to determine a feature vector based on the combined output voice segment.

9. The method of claim 1, wherein the first voice segment is a starting voice segment.

10. The method of claim 1, wherein the outputting the text in the second language corresponding to the voice signal of the first language based on the output voice segment comprises:
    combining a first text in the second language corresponding to the first voice segment and a second text in the second language corresponding to the second voice segment; and
    outputting the text of the second language based on performing correction on the combined first and second texts in the second language.

11. The method of claim 1, wherein the output voice segment is dependent on both of the first voice segment and the second voice segment when the semantic integrity of the first voice segment is less than a threshold.

12. The method of claim 1, wherein the output voice segment is independent of the first voice segment when the semantic integrity of the first voice segment is equal to or greater than a threshold.

13. The method of claim 1, further comprising determining a voice length of the first voice segment,
    wherein the obtaining the output voice segment comprises obtaining the output voice segment based on the voice length of the first voice segment.

14. The method of claim 1, further comprising determining voice speed of the first voice segment,
    wherein the obtaining the output voice segment comprises obtaining the output voice segment based on the voice speed of the first voice segment.

15. The method of claim 1, wherein the semantic integrity of the first voice segment with respect to the second voice segment is determined based on a first neural layer for the first voice segment and a second neural layer for the second voice segment, and
    wherein the first neural layer is different from the second neural layer.

16. The method of claim 15, the first neural layer and the second neural layer is generated based on training translation data.

17. The method of claim 1, wherein the voice feature of the first voice segment is extracted from the first voice segment, and the voice feature of the second voice segment is extracted from the second voice segment.

18. An apparatus for voice translation comprising:
    a memory storing instructions; and
    at least one processor configured to, based on the instructions:
        receive a voice signal of a first language;
        obtain a plurality of voice segments forming the voice signal, the plurality of voice segments comprising a first voice segment and a second voice segment, the first voice segment being a voice segment prior to the second voice segment in a time sequence;
        determine whether the first voice segment is semantically complete or incomplete by determining a semantic integrity of the first voice segment with respect to the second voice segment based on a voice feature of the first voice segment and a voice feature of the second voice segment;
        obtain an output voice segment based on a determination that the first voice segment is semantically complete or incomplete; and
        output a text in a second language corresponding to the voice signal of the first language based on the output voice segment.

19. A computer program product comprising a non-transitory computer readable medium comprising instructions, which when executed by at least one processor, cause the at least one processor to:
- receive a voice signal of a first language;
- obtain a plurality of voice segments forming the voice signal, the plurality of voice segments comprising a first voice segment and a second voice segment, the first voice segment being a voice segment prior to the second voice segment in a time sequence;
- determine whether the first voice segment is semantically complete or incomplete by determining a semantic integrity of the first voice segment with respect to the second voice segment based on a voice feature of the first voice segment and a voice feature of the second voice segment;
- obtain an output voice segment based on a determination that the first voice segment is semantically complete or incomplete; and
- output a text in a second language corresponding to the voice signal of the first language based on the output voice segment.

* * * * *